(12) United States Patent
Takayama et al.

(10) Patent No.: US 8,296,746 B2
(45) Date of Patent: Oct. 23, 2012

(54) OPTIMUM CODE GENERATION METHOD AND COMPILER DEVICE FOR MULTIPROCESSOR

(75) Inventors: Koichi Takayama, Saitama (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 1265 days.

(21) Appl. No.: 12/068,421

(22) Filed: Feb. 6, 2008

(65) Prior Publication Data

US 2009/0113404 A1 Apr. 30, 2009

(30) Foreign Application Priority Data

Oct. 24, 2007 (JP) ................................. 2007-275886

(51) Int. Cl.
*G06F 9/45* (2006.01)
(52) U.S. Cl. ........................................ 717/149; 717/154
(58) Field of Classification Search ........................ None
See application file for complete search history.

(56) References Cited

U.S. PATENT DOCUMENTS

| 5,442,790 | A * | 8/1995 | Nosenchuck | 717/155 |
| 6,226,790 | B1 * | 5/2001 | Wolf et al. | 717/135 |
| 7,143,401 | B2 * | 11/2006 | Babaian et al. | 717/149 |
| 7,275,242 | B2 * | 9/2007 | Liu et al. | 717/154 |
| 7,765,534 | B2 * | 7/2010 | Archambault et al. | 717/154 |
| 7,979,852 | B2 * | 7/2011 | Bodin et al. | 717/154 |
| 8,051,412 | B2 * | 11/2011 | Kasahara et al. | 717/149 |
| 8,136,102 | B2 * | 3/2012 | Papakipos et al. | 717/140 |
| 2004/0068719 | A1 * | 4/2004 | Liu et al. | 717/154 |
| 2004/0093589 | A1 * | 5/2004 | Master | 717/136 |
| 2006/0236310 | A1 * | 10/2006 | Domeika et al. | 717/140 |
| 2006/0282252 | A1 * | 12/2006 | Ciolfi | 703/22 |
| 2007/0130568 | A1 * | 6/2007 | Jung et al. | 718/104 |
| 2007/0169046 | A1 * | 7/2007 | Gordy et al. | 717/151 |
| 2007/0169057 | A1 * | 7/2007 | Silvera et al. | 717/160 |

(Continued)

FOREIGN PATENT DOCUMENTS

| JP | 2000-020482 | 6/1998 |
| JP | 2006-268070 | 3/2005 |

OTHER PUBLICATIONS

Ferner, C., Paraguin Compiler Version 1.0 User Manual [online], 2002 [retreived Dec. 16, 2011], Retrieved from Internet: <http://people.uncw.edu/cferner/Paraguin/userman.pdf>, pp. 1-9.*

(Continued)

*Primary Examiner* — Don Wong
*Assistant Examiner* — Todd Aguilera
(74) *Attorney, Agent, or Firm* — Stites & Harbison, PLLC; Juan Carlos A. Marquez, Esq

(57) ABSTRACT

A method of generating optimum parallel codes from a source code for a computer system configured of plural processors that share a cache memory or a main memory is provided. A preset code is read and operation amounts and process contents are analyzed while distinguishing dependence and independence among processes from the code. Then, the amount of data to be reused among processes is analyzed, and the amount of data that accesses the main memory is analyzed. Further, upon the reception of a parallel code generation policy inputted by a user, the processes of the code are divided, and while estimating an execution cycle from the operation amount and process contents thereof, the cache use of the reuse data, and the main memory access data amount, a parallelization method with which the execution cycle becomes shortest is executed.

13 Claims, 26 Drawing Sheets

U.S. PATENT DOCUMENTS

| | | | | |
|---|---|---|---|---|
| 2007/0283337 | A1* | 12/2007 | Kasahara et al. | 717/149 |
| 2007/0294074 | A1* | 12/2007 | Ciolfi | 703/21 |
| 2007/0294680 | A1* | 12/2007 | Papakipos et al. | 717/149 |
| 2008/0034236 | A1* | 2/2008 | Takayama et al. | 713/322 |
| 2008/0034360 | A1* | 2/2008 | Bodin et al. | 717/154 |

OTHER PUBLICATIONS

Triantafyllis, S., et al., "Compiler Space Exploration", Journal of Instruction Level Parallelism [online], 2005 [retrieved Jun. 16, 2011], Retrieved from Internet: <http://citeseerx.ist.psu.edu/viewdoc/download?doi=10.1.1.136.8643&rep=rep1&type=pdf>, pp. 1-25.*

Keramidas, G., "Cache Replacement Based on Reuse-Distance Prediction", 25th International Conference on Computer Design [online], 2007, retrieved Jun. 21, 2012, retrieved from internet: <http:// ieeexplore.ieee.org/ stamp/stamp.jsp?tp=& arnumber=4601909>, pp. 245-250.*

Beyls, K., et al., "Compile-Time Cache Hint Generation for EPIC Architectures" 2nd Workshop on Explicitly Parallel Instruction Computing Architecture and Compilers [online], 2002 [retrieved Jun. 21, 2012], Retrieved from Internet: <http://citeseerx.ist.psu.edu/viewdoc/download?doi=10.1.1.12.6093&rep=rep1&type=pdf>, pp. 1-11.*

Xu, R., et al., "A Sample Based Cache Mapping Scheme", Proceedings of the 2005 ACM SIGPLAN/SIGBED Conference on Languages Compilers and Tools for Embedded Systems [online], 2005 [retrieved Jun. 21, 2012], Retrieved from Internet: <http://dl.acm.org/citation.cfm?id=1065934>, pp. 166-174.*

Hans Zima et al., "Supercompilers for Parallel and Vector Computers", Addison-Wesley Publishing Company Inc., original English language edition 1991, pp. 276-297 and 390 in Japanese.

Christopher Batten et al., "Cache Refill/Access Decoupling for Vector Machines", Proceedings of the 37th International Symposium on Microarchitecture (MICRO-37), Dec. 2004, 12 pages.

Aho, Alfred V., et al., "Compilers, principles, techniques, and tools", Addison-Wesley Publishing Company, Bell Telephone Laboratories, Incorporated, 1986, pp. 39-49. 159-266, 276-279.

* cited by examiner

FIG. 5 f90 —o_section_data_parallel(file,subroutine,line(1:100), [calculation, data])
              501                          502                      503

|!opt_section_data|(line1:6,|[calculation,data])|

```
do i=1, 400
  a(i)=x(i)+y(i)
  b(i)=a(i)+(u(i)*v(i))
  c(i)=p(i)+q(i)
  d(i)=c(i)*(x(i)+w(i))
enddo
```

```
real(8)::a(10000)
real(8)::b(100), c(100)
real(8)::x=1
integer(4)::i
```
   604      605      606

|!opt_section_data|(line1:5,|[calculation,data])|

```
read(10) a
call mpi_isend(b,2,100,...
do i=1, 100
  c(i)=x
enddo
```

FIG. 13

| PROCESS NUMBER 1301 | PROCESS ITEM 1302 | ABSENCE OR PRESENCE OF DATA DEPENDENCE 1303 | USED VARIABLE NAME 1304 | DEPENDENT VARIABLE NAME 1305 | OPERATION AMOUNT [Flop] 1306 | PARALLELIZATION METHOD 1307 |
|---|---|---|---|---|---|---|
| 1 | ADDITION | ABSENCE | x[i], y[i], a[i] | | 400 | PRIORITY ON MAIN MEMORY |
| 2 | | | | | | |
| ... | | | | | | |
| 5 | MULTIPLICATION | PRESENCE | d[i],c[i],x[i] | c[i] | 800 | PRIORITY ON MAIN MEMORY |
| | | | | | | |

FIG. 14

| PROCESS NUMBER 1401 | AUXILIARY NUMBER 1402 | REUSE VARIABLE NAME 1403 | DATA LENGTH [Byte] 1404 | NUMBER OF ELEMENTS 1405 | STRIDE WIDTH [Byte] 1406 | REUSE INTERVAL [Byte] 1407 |
|---|---|---|---|---|---|---|
| 1 | | | | | | |
| 2 | | | | | | |
| ... | | | | | | |
| 5 | 1 | c[i] | 3200 | 400 | 8 | 3200 |
| 5 | 2 | x[i] | 3200 | 400 | 8 | 25600 |
| | | | | | | |

FIG. 15

| 1501 | 1502 | 1503 | 1504 | 1505 | 1506 | 1507 |
|---|---|---|---|---|---|---|
| PROCESS NUMBER | AUXILIARY NUMBER | MAIN MEMORY REFERENCE VARIABLE NAME | DATA LENGTH [Byte] | NUMBER OF ELEMENTS | STRIDE WIDTH [Byte] | TYPE |
| 1 | 1 | x[i] | 3200 | 400 | 8 | load |
| 1 | 2 | y[i] | 3200 | 400 | 8 | load |
| ... | | | | | | |

| No. | ITEM | VALUE |
|---|---|---|
| 1 | NUMBER OF REGISTERS | 128 |
| 2 | NUMBER OF PROCESSORS | 4 |
| 3 | INDEPENDENT CACHE CAPACITY [Byte] | 32000 |
| 4 | SHARED CACHE CAPACITY [Byte] | 1000000 |
| 5 | CACHE LOAD COST [cycle/Byte] | 6 |
| 6 | MAIN MEMORY LOAD COST [cycle/Byte] | 100 |
| 7 | MAIN MEMORY STORE COST [cycle/Byte] | 120 |
| 8 | SYNCHRONIZATION ACQUISITION 1 COST [cycle] | 200 |
| 9 | SYNCHRONIZATION ACQUISITION 2 COST [cycle] | 150 |
| 10 | OPERATION PERFORMANCE [flop/cycle] | 4 |
| 11 | ⋮ | |

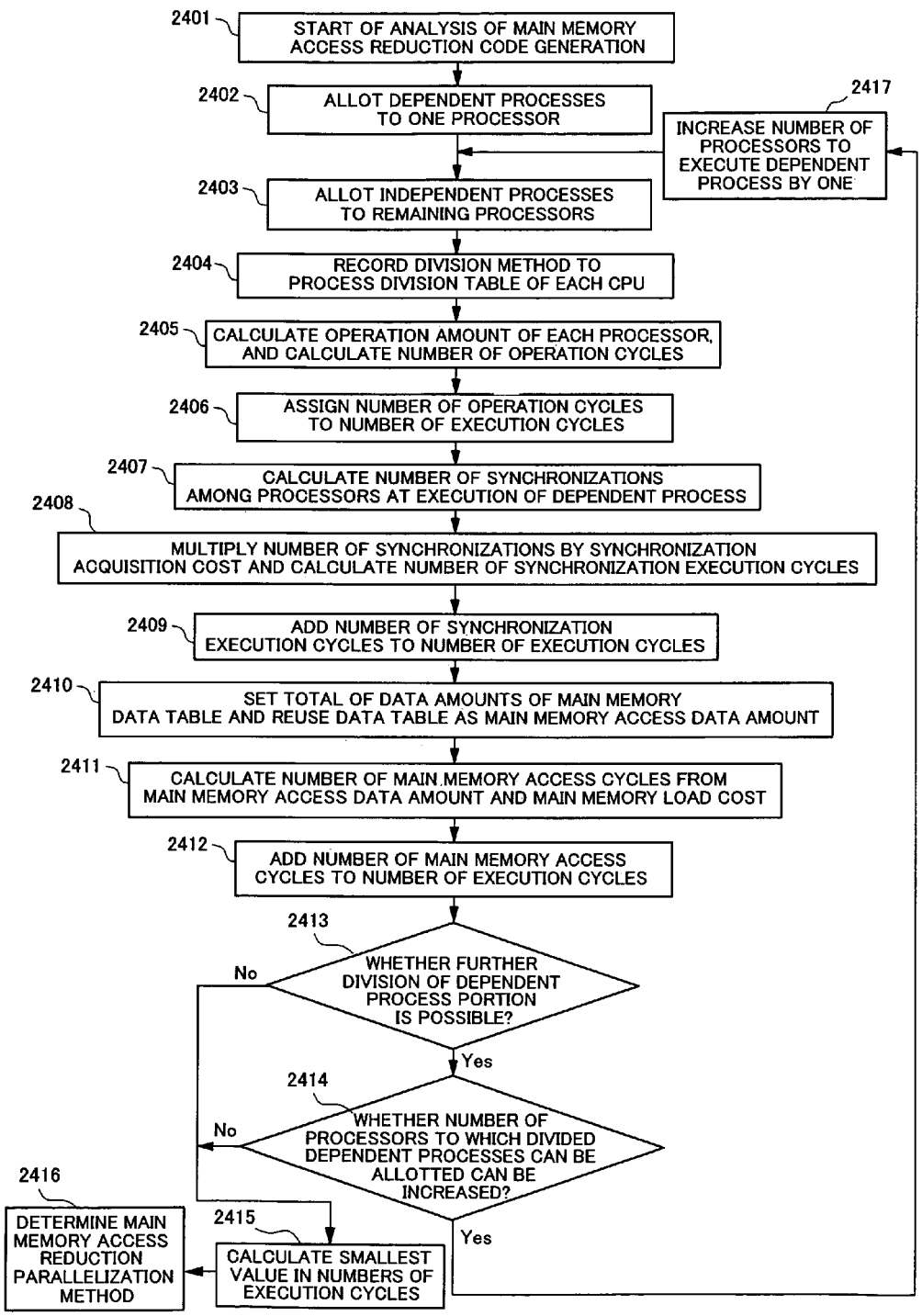

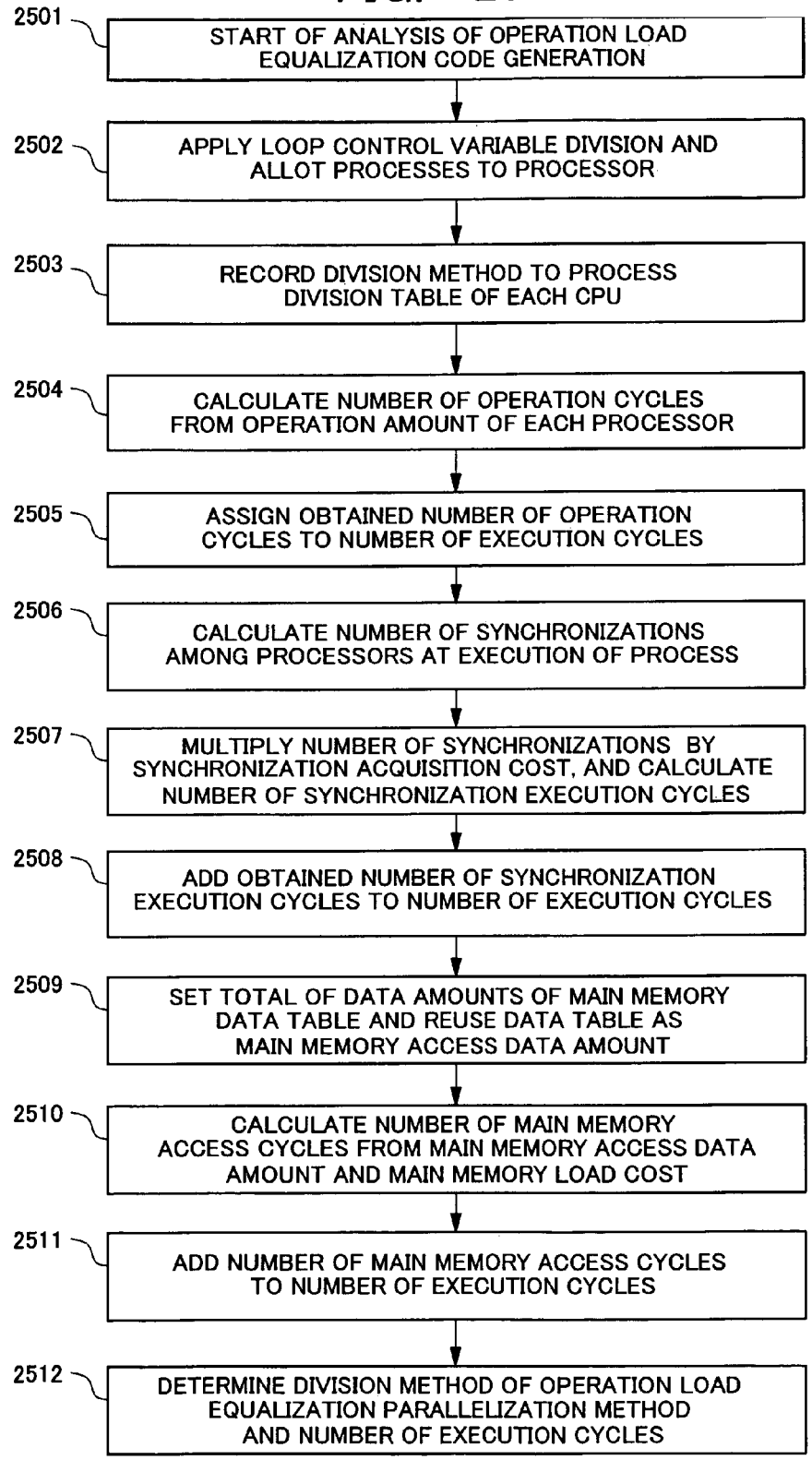

FIG. 26

2601
```
do i=m, n
  a(i)=x(i)+y(i)
  b(i)=a(i)+(u(i)*v(i))
  c(i)=p(i)+q(i)
  d(i)=x(i)*(c(i)+w(i))
enddo
```

FIG. 27

```
if((n>m) .and. (m>=100) .and. (n<=200)) then
```
2701 — PARALLELIZATION METHOD 1
(MAIN MEMORY ACCESS REDUCTION PARALLELIZATION METHOD)
```
elseif ((n>m) .and. m>=100)then
```
2702 — PARALLELIZATION METHOD 2
(MAIN MEMORY ACCESS REDUCTION PARALLELIZATION METHOD)
```
else
```
2703 — PARALLELIZATION METHOD 3
(OPERATION LOAD EQUALIZATION PARALLELIZATION METHOD)
```
endif
```

FIG. 28

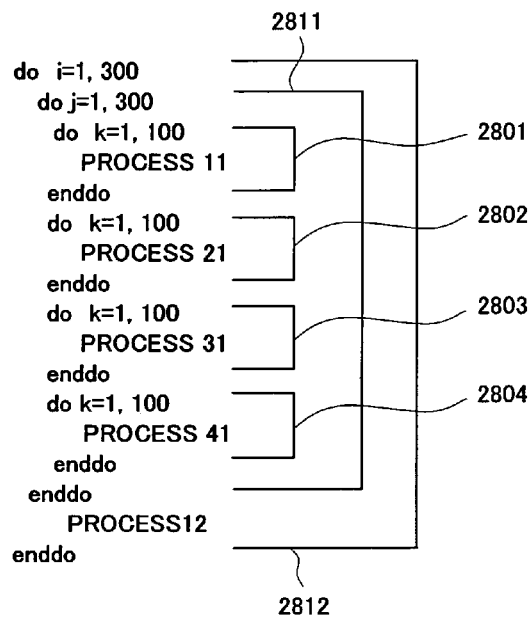

```
do i=1, 300
  do j=1, 300
    do k=1, 100
      PROCESS 11                    — 2801
    enddo
    do k=1, 100
      PROCESS 21                    — 2802
    enddo
    do k=1, 100
      PROCESS 31                    — 2803
    enddo
    do k=1, 100
      PROCESS 41                    — 2804
    enddo
  enddo
      PROCESS12
enddo
```

| NUMBER OF EXECUTION CYCLES | CPU0 | CPU1 | CPU2 | CPU3 |
|---|---|---|---|---|
| 150 | PROCESS11 PROCESS12 PROCESS13 PROCESS14 | PROCESS21 | PROCESS31 | PROCESS41 |
| 130 | PROCESS11 PROCESS13 PROCESS14 | PROCESS21 SYNCHRONIZATION (0, 1) PROCESS12 | PROCESS31 | PROCESS41 |
| 120 | PROCESS11 PROCESS14 | PROCESS21 SYNCHRONIZATION (0, 1) PROCESS12 | PROCESS31 SYNCHRONIZATION (0, 2) PROCESS13 | PROCESS41 |

1

OPTIMUM CODE GENERATION METHOD AND COMPILER DEVICE FOR MULTIPROCESSOR

CROSS-REFERENCE TO RELATED APPLICATION

The present application claims priority from Japanese Patent Application No. JP2007-275886 filed on Oct. 24, 2007, the content of which is hereby incorporated by reference into this application.

TECHNICAL FIELD OF THE INVENTION

The present invention relates to an optimum code generation method and a compiler device for a multiprocessor. More particularly, it relates to a method of generating codes for parallel processing and a compiler device for efficiently operating a plurality of processors.

BACKGROUND OF THE INVENTION

Along with the development of semiconductor manufacturing technologies, the high integration of transistors has been realized and processors have achieved high computing power. On the other hand, there has been a problem of large power consumption due to high operating frequencies and leakage current of the processors. As a method to avoid this problem, as described in C. Scott Ananian, Krste Asanovic, Bradley C. Kuszmaul, Charles E. Leiserson, and Sean Lie, "Cache Refill/Access Decoupling for Vector Machines", 37th International Symposium on Microarchitecture (MICRO-37), Portland, Oreg., December 2004 (Non-Patent Document 2), a method in which plural SIMD (Single Instruction Multi Data) processors or plural vector processors are coupled in common to a main memory or a cache memory has been known. According to this method, by arranging many computing units while suppressing the power consumption without increasing the operating frequency, high computing power is realized.

Further, Japanese Patent Application Laid-Open Publication No. 2006-268070 (Patent Document 1) has disclosed a compilation processing method in which object codes for parallel computers are generated by the use of the section parallelization to divide command rows in the loop together with the element parallelization to divide elements of loop control variables. Also, Japanese Patent Application Laid-Open Publication No. 2000-20482 (Patent Document 2) has described a compiling method in which multiple loops having data dependence existing over loop repetitions can be parallelly executed in a pipeline manner by a multiprocessor. In this method, a loop to issue barrier synchronization is generated before and after the multiple loops, and a sentence to issue the barrier synchronization is generated immediately after the divided loops. In Hanz Zima and Barbara Chapman, translated by Yoichi Muraoka, "Super Compilers", Ohmsha Ltd., 1995 (Non-Patent Document 1) and A. V. Aho, R. Sethi, J. D. Ullman, "Compilers", Saiensu-sha Co., Ltd., 1990 (Non-Patent Document 3), concrete methods of packaging compilers and the like have been described.

SUMMARY OF THE INVENTION

As described above, with the application of plural SIMD processors and plural vector processors and the like, the processing performances of processors have been enhanced. However, the improvement in data supply performances from the main memory proportional to the enhanced processing performances of processors has not been achieved. Accordingly, the problem occurs in which the data transfer time from the main memory becomes long and the processes in the processors are stopped during the time, and the performances of plural processors cannot be fully exerted. This is generally known as the memory wall problem.

Further, as described in the Patent Document 1 and the like, when an operation loop is divided and executed by plural processors, the control variable of the operation loop is divided and allotted to the processors and the operations are executed by the respective processors. FIG. 1 shows an example of a configuration diagram of a computer system to execute the operation at this time, and FIG. 2 shows an example of parallelization of the operation. The computer in FIG. 1 is configured to have four processors (CPU) 106 that share a cache memory 107. In FIG. 2, a program 201 is divided into four programs by the control variable of the operation loop, and these four divided programs 202 are allotted to the respective processors. Since the respective processors execute their calculations at the same time by the use of different elements having the same array name, the four processors share the cache memory. However, the capacity of the cache memory that one processor can use for calculations is reduced to ¼. As a result, the problem occurs in which the capacity of the cache memory provided for one processor becomes small, and the amount of data to be reused is decreased.

Herein, the case where SIMD processors or vector processors as described in the Non-Patent Document 2 are used in order to increase the computing power of the computers is assumed. Since a large number of computing units are arranged in SIMD processors or vector processors, in order to enhance the execution efficiency of the respective processors, the operation loop length to be processed by one processor needs to be kept longer than a specified length. However, when the loop length of the operation loop is extended, the amount of data to be registered to the cache memory increases. Therefore, the local data access of the cache memory is lost, and the data reusability is deteriorated.

The present invention has been made in view of the problems above, and the above and other objects and novel characteristics of the present invention will be apparent from the description of this specification and the accompanying drawings.

The typical ones of the inventions disclosed in this application will be briefly described as follows.

In the method of generating optimum codes according to an embodiment of the present invention, for a computer configured of plural processors that share a main memory or a cache memory, for the purpose of increasing the execution efficiency of the processors while reducing the data transfer amount from the main memory to the processors, optimum parallel codes processed by the respective processors are generated from a source code. In concrete, a computer system divides plural processes included in the source code to the plural processors, and analyzes the divided source codes to perform analyses of the operation amount and the operation sequence dependence relation of the processors, the data reusability of the cache memory, the load data amount and store data amount to the main memory or the cache memory, and the like. Then, while estimating the execution cycle time of the divided source codes by the use of the computer performances defined in advance by a user (for example, access time of the main memory, access time of the cache memory, capacity of the cache memory, and the like), the computer system generates parallel codes with which the execution cycle time becomes shortest. By the processes of the computer system as described above, the optimum parallel codes to increase the execution efficiency of the plural processors can be generated.

Note that, when the plural processes included in the source code are divided into the plural processors, the division of a first method in which the data reusability of the cache memory is improved and the number of accesses from the plural processors to the main memory is reduced or the division of a second method in which the operation process amounts by the plural processors are equalized is carried out. Further, to the source codes to which the division of the first method has been carried out, the division of the second method is carried out. Then, with regard to the source codes to which such divisions have been carried out, the execution cycle time is estimated respectively, and consequently, parallel codes corresponding to the source codes with which the execution cycle time becomes shortest are generated. In this manner, in view of all the aspects of the main memory access, the equalization of the process amounts of the processors and the combination thereof, the optimum parallel codes can be generated.

Further, in the method of generating optimum codes according to an embodiment of the present invention, it is also possible for its user to determine an optional range in the source codes in advance and designate whether the division of the first method or the division of the second method is applied thereto. By this means, while making the most of the user's knowledge and experience and the like, the optimization in accordance with the process contents can be achieved for each range in the source codes. As a result, it is possible to generate optimum parallel codes as a whole.

The effects obtained by typical aspects of the present invention will be briefly described below.

By using the method of generating optimum codes according to an embodiment of the present invention, it is possible to generate the parallel codes that efficiently operate the respective processors while reducing the data transfer amount from the main memory among the plurality of processors that share the main memory or the cache memory.

BRIEF DESCRIPTIONS OF THE DRAWINGS

FIG. 5 is an explanatory drawing showing a concrete example in the case where an instruction of parallelization policy is given by a compile option;

FIG. 6 is an explanatory drawing showing a concrete example in the case where an instruction of parallelization policy is given to a source code;

FIG. 13 is an explanatory drawing showing a configuration example of a process content table in FIG. 4;

FIG. 14 is an explanatory drawing showing a configuration example of a reuse data table in FIG. 4;

FIG. 15 is an explanatory drawing showing a configuration example of a main memory data table in FIG. 4;

FIG. 19 is an explanatory drawing showing a detailed example of a computer condition input unit in FIG. 4;

FIG. 24 is a flow chart showing an example of detailed process contents when performing the analysis of the main memory access reduction parallelization method for the computer system in FIG. 23;

FIG. 25 is a flow chart showing an example of detailed process contents when performing the analysis of the operation load equalization parallelization method for the computer system in FIG. 23;

FIG. 26 is a diagram showing an example of a source code to be an evaluation objective in a code generation method according to a third embodiment of the present invention;

FIG. 27 is a diagram showing an example of parallel codes generated in the code generation method according to the third embodiment of the present invention;

FIG. 28 is a supplementary figure of FIG. 11; and

FIG. 29 is a diagram showing an example of a process division table of each CPU generated in the process of FIG. 20.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted. Further, in the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

First Embodiment

Figure 1:
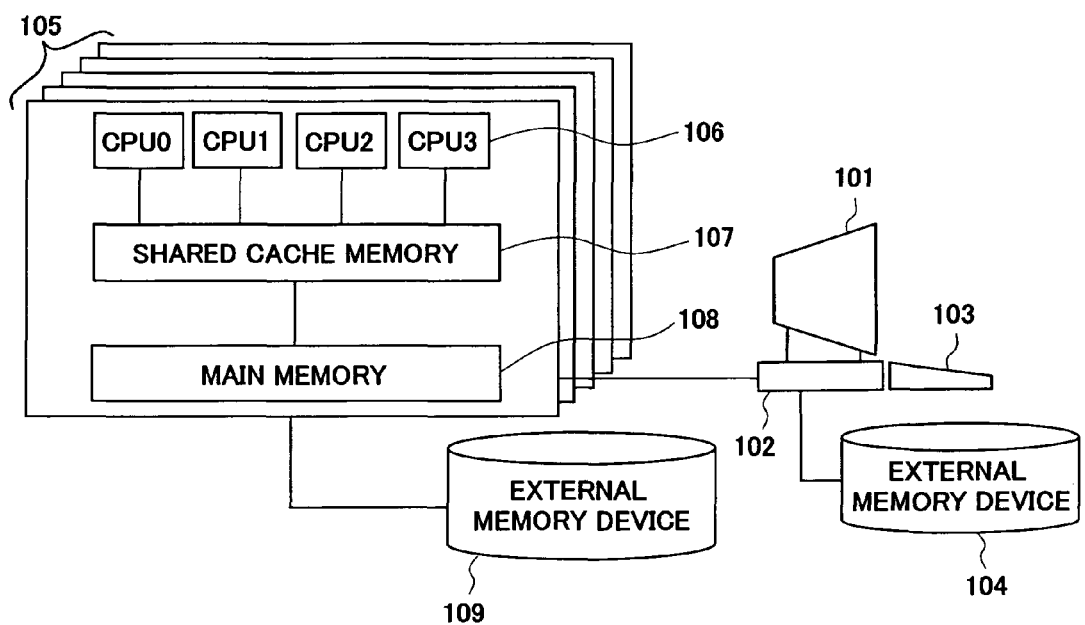
FIG. 1 is a configuration diagram showing an example of a computer system that executes the control by using the codes generated in a code generation method according to a first embodiment of the present invention.
Figure 2:
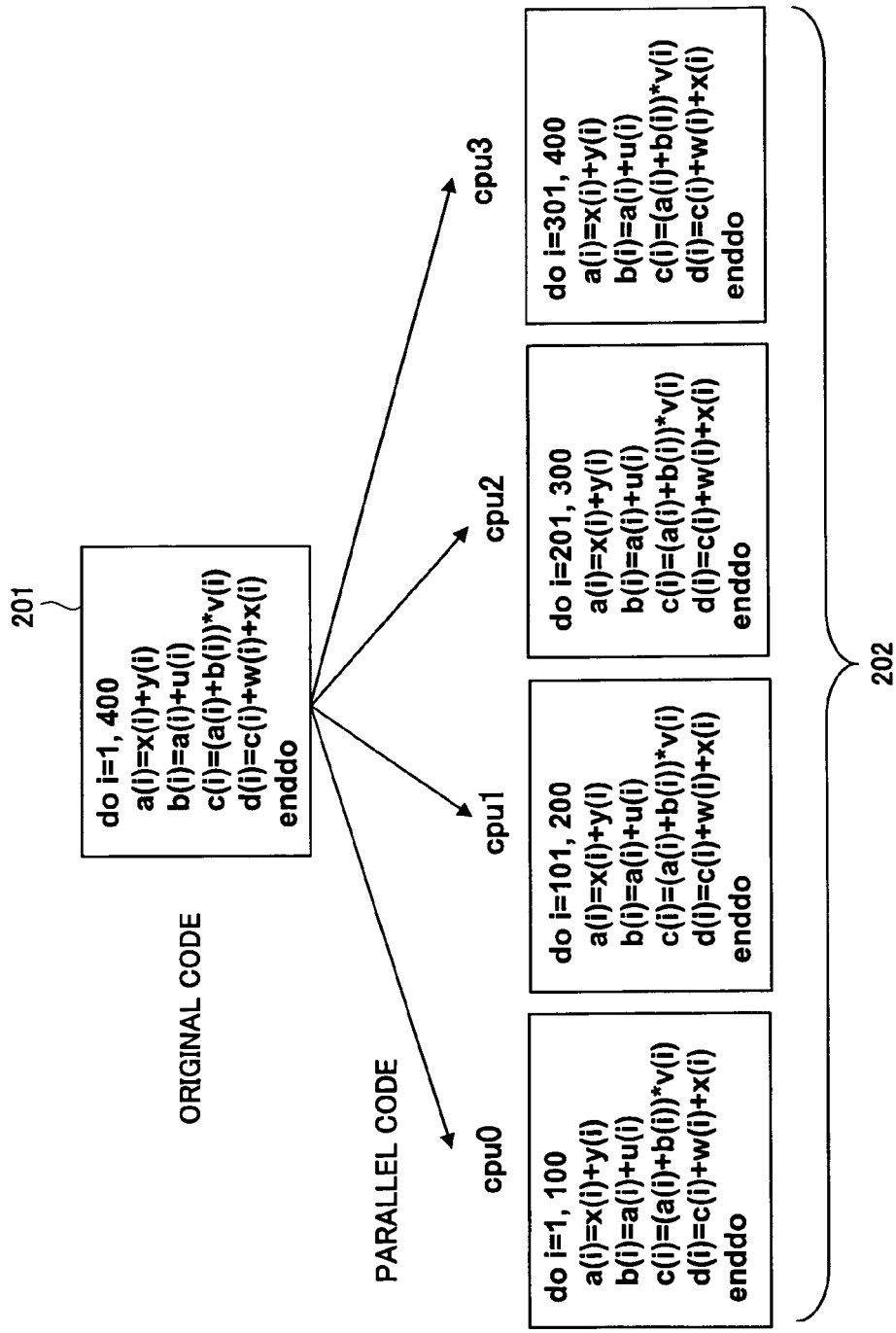
FIG. 2 is an explanatory drawing showing an example of operation parallelization.

FIG. 1 is a configuration diagram showing an example of a computer system that executes the control by using the codes generated in a code generation method according to a first embodiment of the present invention. The computer system includes a display unit 101 and a terminal unit 102 for executing the codes, a keyboard 103 to input commands, an external memory device 104 connected to the terminal, a calculation node group 105 for executing the codes, and an external memory device 109 connected to the calculation node group.

One calculation node comprises plural processors (CPU) 106 that share a main memory device 108 or a cache memory 107, and the calculation node group is configured of one or plural calculation nodes. Commands are inputted from the keyboard 103 and the terminal unit 102, and generated codes are executed by the calculation node group 105. In the present embodiment, the generation method of parallel codes for efficiently operating the plural processors 106 of the calculation node group 105 is described.

Figure 3:
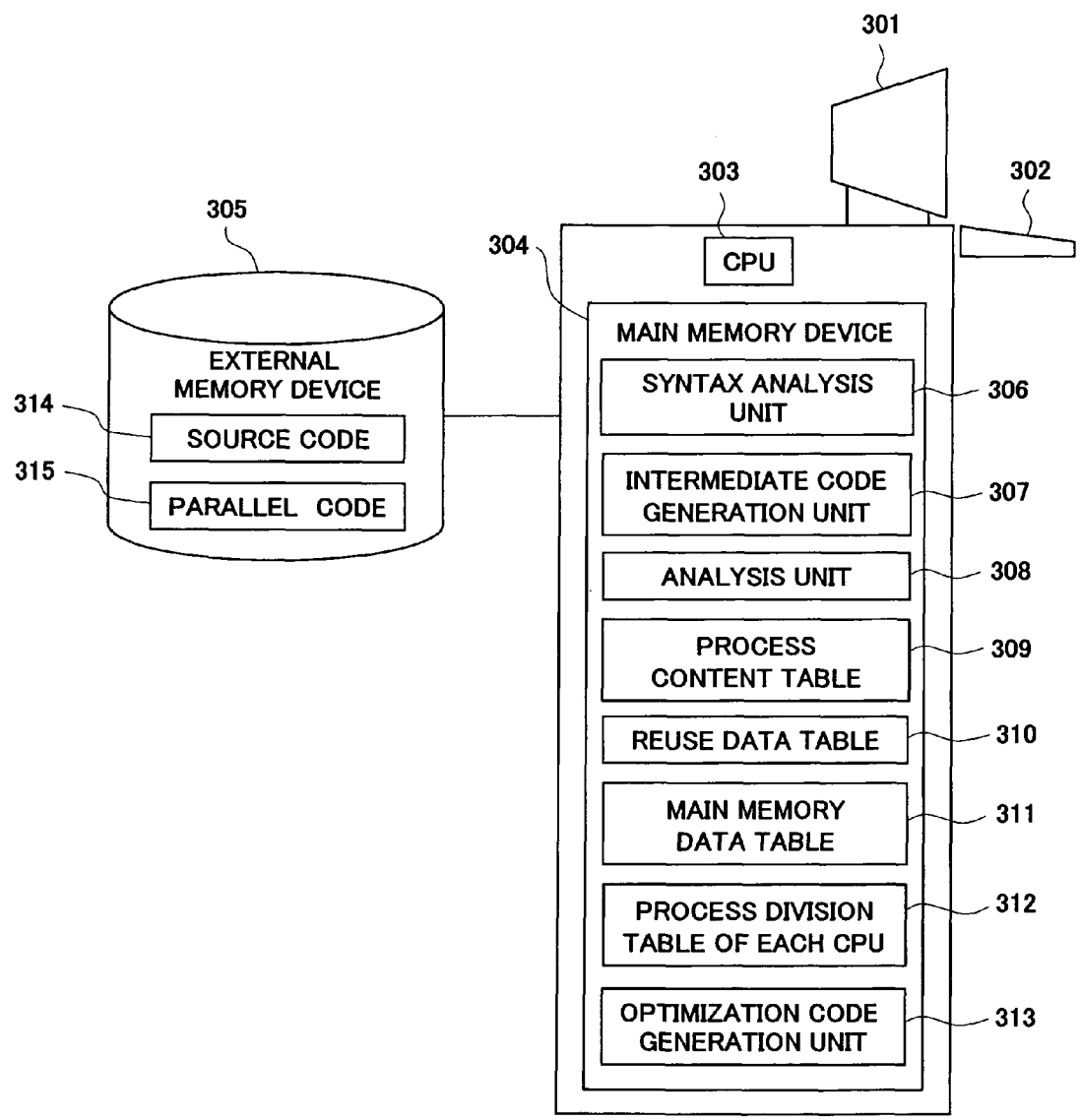
FIG. 3 is a configuration diagram showing an example of a computer system that generates the codes in the code generation method according to the first embodiment of the present invention.

The parallel code generation method of the present embodiment is realized by the terminal unit 102, the calculation node group 105 or another computer system. FIG. 3 shows a configuration diagram of a computer system which generates the codes. This computer system comprises a display unit 301, a keyboard 302, a processor (CPU) 303, a main memory device 304, and an external memory device 305. When generating parallel codes, the user inputs the command for code generation start from the keyboard 302. A code generation state, an error message and an end message are displayed on the display unit 301.

In the external memory device 305, a source code 314 and parallel codes 315 finally generated are stored. In the main memory device 304, a syntax analysis unit 306, an intermediate code generation unit 307 to generate intermediate codes, and an analysis unit 308 that performs analysis with the generation of parallel codes are stored. Further, in the main memory device 304, a process content table 309 to be generated in the course of execution of the analysis unit 308, a reuse data table 310, a main memory data table 311, a process division table for each CPU 312, and an optimization code generation unit 313 are stored. The parallel code generation process is controlled and executed by the processor (CPU) 303.

Figure 4:
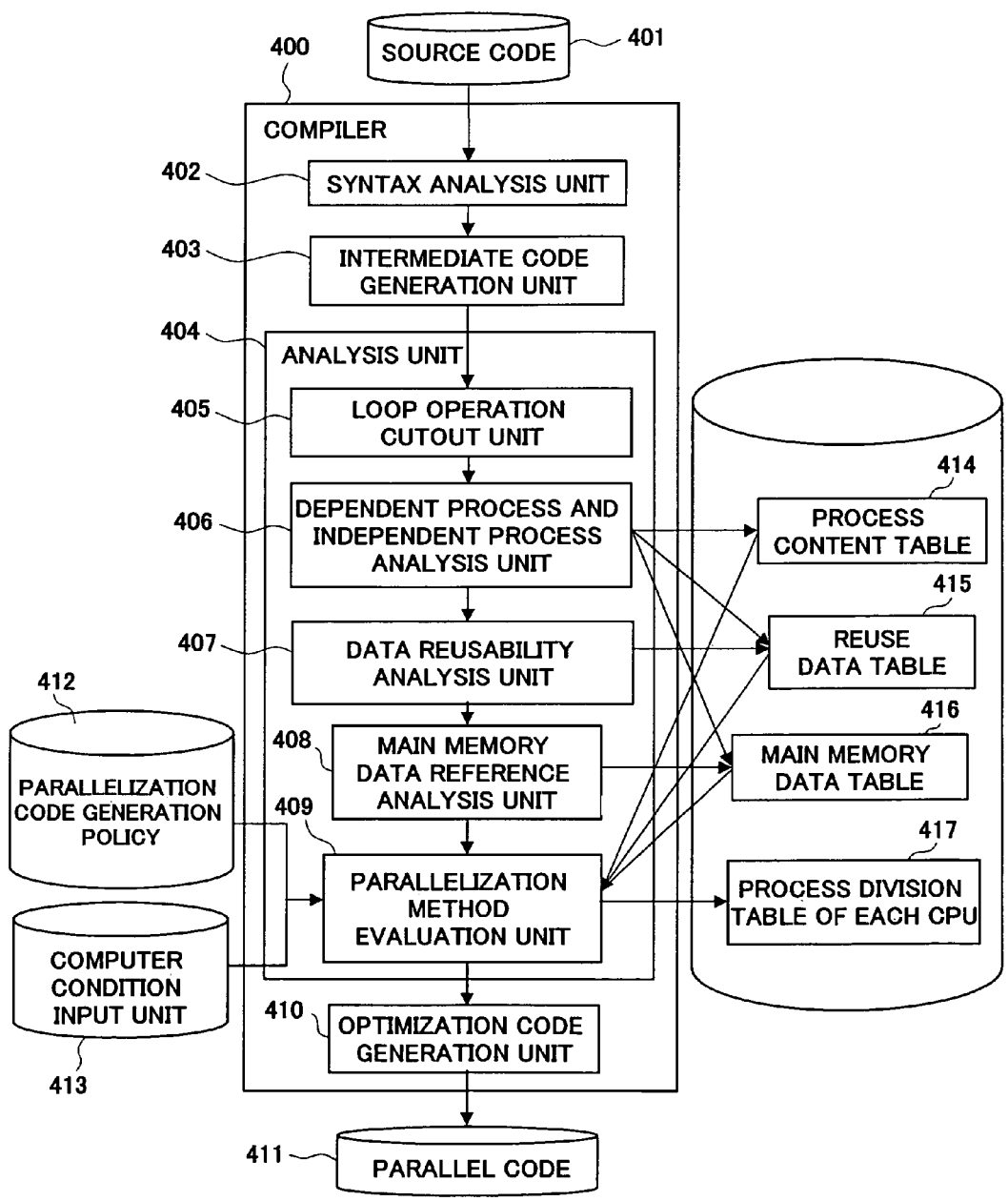
FIG. 4 is a configuration diagram showing a detailed example of a function to generate parallelization codes in the computer system in FIG. 3.

The process flow in the generation of the parallel codes from the source code in the configuration in FIG. 3 is roughly shown in FIG. 4. The generation of codes is carried out by inputting a source code 401 to a code conversion unit (compiler) 400. The code conversion unit 400 first performs the process using the syntax analysis unit 402 and an intermediate code generation unit 403. The method of syntax analysis is described in, for example, Non-Patent Document 3. The process of the intermediate code generation unit 403 will be described later with reference to FIG. 7. Next, the code conversion unit 400 performs analysis for the intermediate codes by using the analysis unit 404.

The code generation method of the present embodiment is characterized mainly by the process contents by this analysis unit 404. In the example in FIG. 4, analysis of the intermediate codes by the use of the analysis unit 404 is carried out, and the code conversion unit 400 in this case corresponds to that generally called as a compiler device (compiler). However, in the code generation method of the present embodiment, it is possible to carry out not only the analysis of the intermediate codes by the use of the analysis unit 404, but also the analysis of the source code 401 by the use of the analysis unit 404. In this case, for example, after analyzing the source code 401, the code conversion unit 400 generates optimization source code in which process for each CPU is clarified. Then, the optimization source code is compiled by a normal compiler device, thereby obtaining the optimization codes.

The analysis unit 404 performs processes using a loop operation cutout unit 405, a dependent process and independent process analysis unit 406, a data reusability analysis unit 407, a main memory data reference analysis unit 408, and a parallelization method evaluation unit 409 in sequence. First, in the loop operation cutout unit 405, the analysis of the main memory access in the process per operation loop and before and after the same and the process parallelization are carried out. The details thereof will be described later with reference to FIG. 11 and FIG. 28. On the basis of the results of the loop operation cutout unit 405, in the dependent process and independent process analysis unit 406, processes such as the arithmetic operations, the data reading from files and communications among processors are recognized, and the order of data to be referenced by processors and data to be written from the processors to the cache memory or the main memory in these processes is obtained. In the case where it is necessary to ensure the process sequence in the data writing, the type of data is recorded in a process content table 414 as a dependent process.

Subsequently, in the data reusability analysis unit 407, when the data to be used in the process is the reuse data, the amount of data to be reused and the data reference interval up to the point of reuse are analyzed. Detailed procedures thereof will be described later with reference to FIG. 12 and FIG. 16. When the data is reuse data, it is recorded in a reuse data table 415. Next, in the main memory data reference analysis unit

408, whether the data to be used for the process is referenced from the main memory is analyzed, and the data referenced from the main memory is registered to a main memory data table 416. Detailed analysis procedures thereof will be described later with reference to FIG. 12 and FIG. 16.

Finally, in the parallelization method evaluation unit 409, on the basis of a parallelization code generation policy 412 that the user inputs, a computer condition input unit 413, a process content table 414, a reuse data table 415, and a main memory data table 416, the process division in the parallelization is determined. Detailed procedures thereof will be described later with reference to FIG. 17, FIG. 18, FIG. 20, FIG. 21 and FIG. 22. Then, the results obtained in the foregoing manner are recorded in a process division table 417 of each CPU. Through the processes in the analysis unit 404 as described above, on the basis of the results of the parallelization method evaluation unit 409 and the process division table 417 of each CPU, the code conversion unit 400 generates optimization codes by the use of the optimization code generation unit 410, and as a result, parallel codes 411 are generated.

FIG. 5 and FIG. 6 show the parallelization policy that the user designates. FIG. 5 shows an example of a compile option. When the parallelization method of the present embodiment is applied, a command 501 of parallelization policy is inputted, and then detailed designations are followed. A file name, a subroutine name or a function name, and a line number in a file name designated by a source code (502) are inputted. Further, in the case where parallelization codes are generated with priority on load equalization of operation amount executed by each processor in the parallelization, the parallelization policy 503 is inputted as "calculation", and in the case where parallelization codes are generated with priority on making the access time to the main memory shortest by increasing the reusability of the cache memory, the parallelization policy 503 is inputted as "data".

Further, it is also possible to give the parallelization policy not only by the command but also by designating a part in the source code. FIG. 6 shows an example where an instruction of parallelization policy is given to the source code. The commands of parallelization policy are shown by 601 and 604. In the next arguments 602 and 605, the range to designate the parallelization policy is shown by the line number. Finally, as the parallelization policy to be applied, in the case where parallelization codes are generated with priority on load equalization of operation amount, designation is made by "calculation", and in the case where parallelization codes are generated with priority on making the access time to the main memory shortest by increasing the reusability of the cache memory, designation is made by "data" (603, 606).

In the example in FIG. 6, the process designated by the parallelization policy 601 is directed to the parallelization of operation loop. On the other hand, the process designated by the parallelization policy 604 includes not only operation, but also data reading from disk to the main memory (read sentence) and data communications among processors (call mpi_isend sentence). With regard to this process, when the parallelization to four processors is carried out by "data", for example, processor No. 0 performs the reading from disk to the main memory, processor No. 1 performs the communication process among processors, and processors No. 2 and No. 3 perform arithmetic operation, respectively.

In this specification, the parallelization method in which control variables of processing loop are divided to equalize the processing loads is referred to as the operation load equalization parallelization method. Further, the parallelization method in which processes that are not in loop structure are divided and allotted to the processors and the method in which the division of processes that are not in loop structure and the division by the loop control variable are used in combination like the example in FIG. 6 mentioned above are referred to as the main memory access reduction parallelization method. In the main memory access reduction parallelization method, when the parallelization policy is designated by "data" in compile option and directive in FIG. 5 or FIG. 6, the analysis of source code is carried out.

Figure 7:
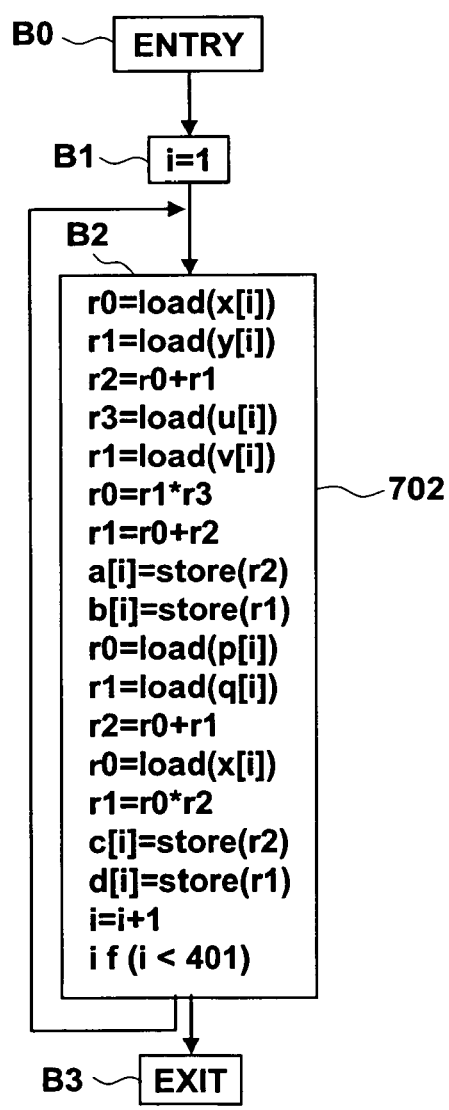
FIG. 7 is an explanatory drawing showing a concrete example of an intermediate language generated from the source code.

FIG. 7 shows an example where an intermediate code 702 is generated from a source code 701 by the process of the syntax analysis unit 402 and the intermediate code generation unit 403 in FIG. 4. The intermediate code is expressed by a graph in which basic blocks are connected by edges. Such a graph is referred to as a control flow graph. B0 to B3 represent basic blocks. The basic block is configured of plural sentences, and each sentence almost corresponds to an effective command and is called "command" in some cases. "r0=load (x[i])" of B2 means that i element value of a variable x of the array type is loaded and assigned to a variable r0. In the present embodiment, the cache memory access or main memory access concerning the optimization is expressed by "load".

Figure 8:
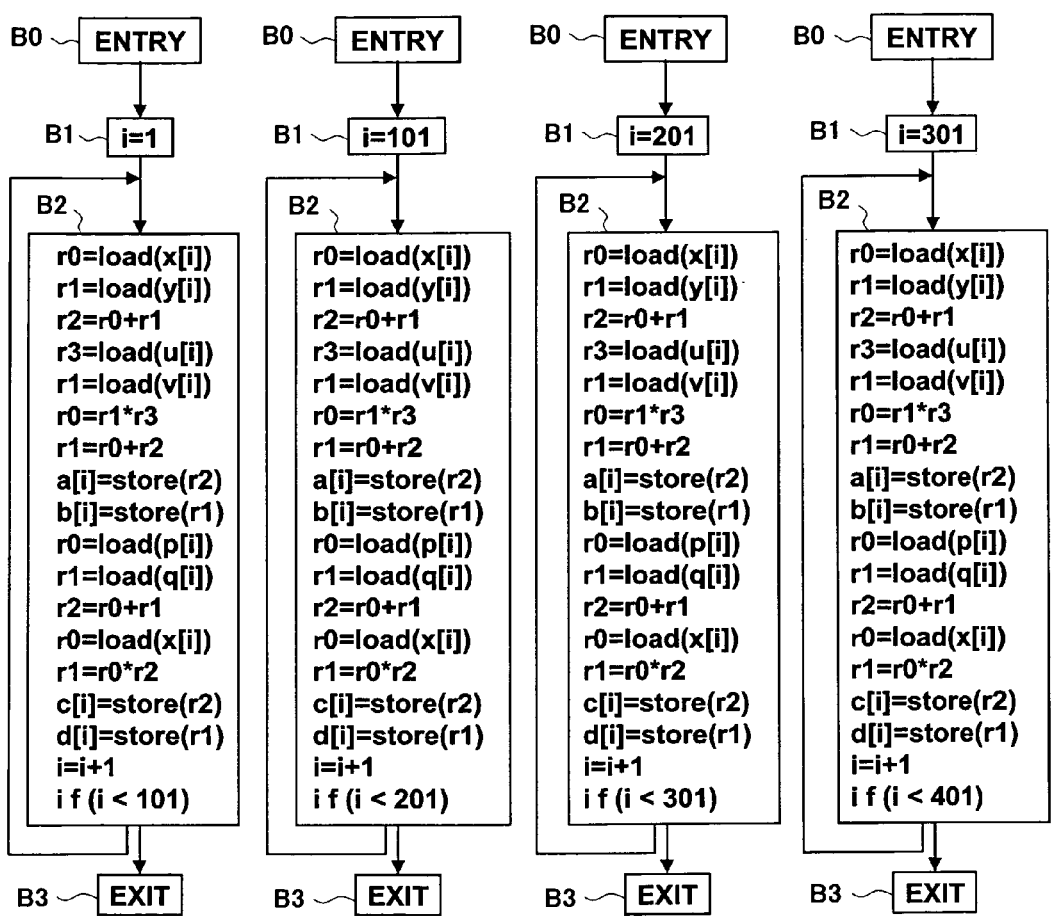
FIG. 8 is an explanatory drawing showing a concrete example in the case where operation parallelization is carried out to the intermediate language in FIG. 7.

FIG. 8 shows the intermediate codes in the case where the arithmetic operation is divided and executed in each CPU of the four processors by the use of the intermediate code 702 in FIG. 7. In FIG. 7, a control variable i of loop operation is set to 1 in B1 and then the operation of B2 is started. i is counted up in B2 and when i=401 is reached, the operation of B2 is ended and process shifts to B3. FIG. 8 shows that this operation is divided equally into four and executed by respective processors. In B2 in FIG. 8, by the division into quarters such as i=1 to 100, i=101 to 200, i=201 to 300, and i=301 to 400, the operation amount in respective processors can be divided equally. The division method described above is the parallelization method with priority on load equalization of operation amount (that is, operation load equalization parallelization method).

Figure 9:
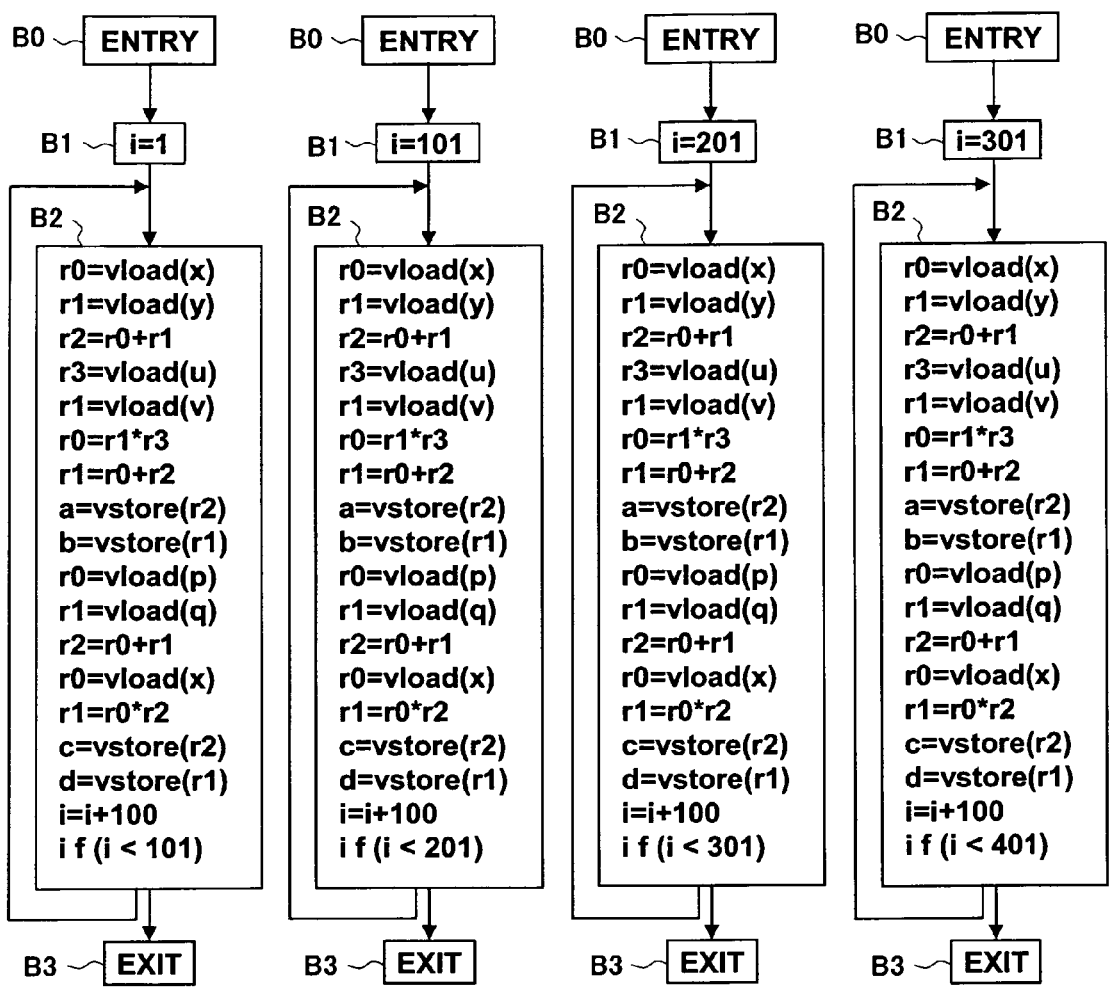
FIG. 9 is an explanatory drawing showing a concrete example of an intermediate language generated by using the operation load equalization parallelization method for vector processors.

In the parallelization method with priority on the load equalization of operation amount, since data that the respective processors operate are different, in the case where four processors share the cache memory 107 in one calculation node of the calculation node group 105 in FIG. 1, the capacity of the shared cache memory that one processor uses becomes ¼ of the total capacity. FIG. 9 shows an example of the intermediate code in the case where the processor used in FIG. 8 is a vector processor. If the vector length is 100, "r0=load(x[i])" on the first line in B2 becomes "r0=vload(x)" using the vload command, and elements of i=1 to 100 are executed at one time instead of one element of i. Therefore, r0 becomes a variable having not one element but elements 1 to 100. With regard to "r1=vload(y)", "r2=r0+r1" and the like that are the commands to be executed thereafter, data reading and operation are all performed to 100 elements.

Herein, in the case where the data amount of one element of variable is 8 bytes, since the number of elements per one element is 100, the data amount of one variable is 800 bytes. In the case of the execution by one calculation node of the calculation node group 105 in FIG. 1, if load of reuse data can be executed from the shared cache memory, the execution can be made faster than the case where the reuse data is loaded from the main memory. In operation B2, only the variable x is used twice. Since 8 types of variables (x, y, u, v, a, b, p, q) appear until the variable x is loaded for the second time and each variable is 800 bytes, the cache memory that one processor uses is 6.4 K bytes. For the four processors, it is four times of 6.4 K bytes, that is, 25.6 K bytes.

Figure 10:
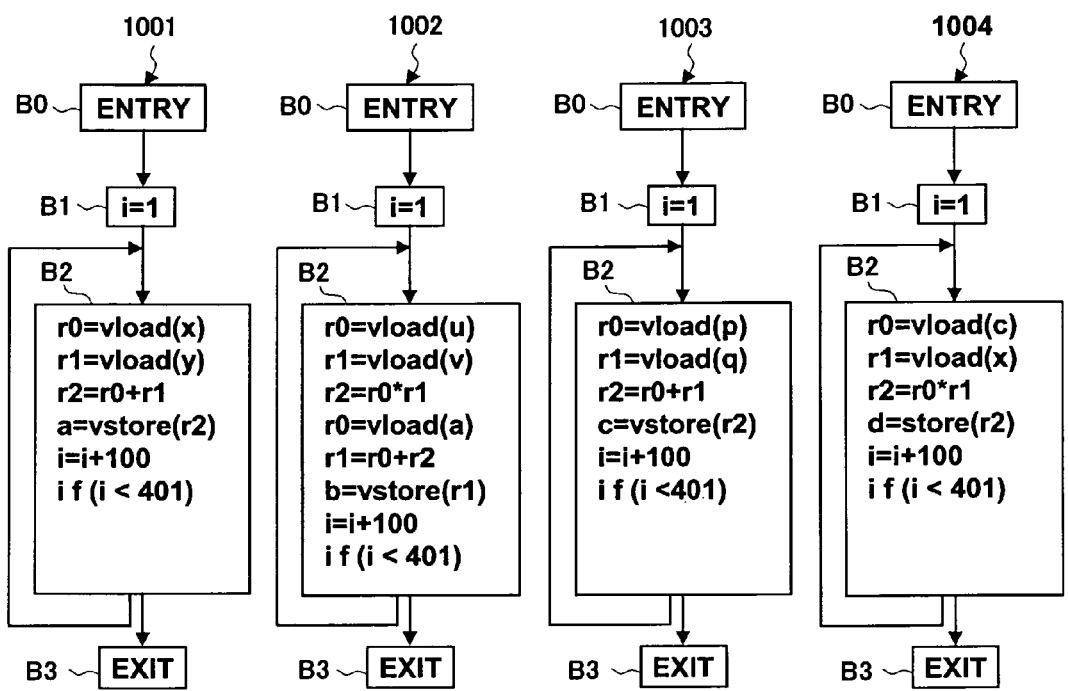
FIG. 10 is an explanatory drawing showing a concrete example of an intermediate language generated by using the main memory access reduction parallelization method for vector processors.

FIG. 10 shows a parallelization method different from the parallelization method with priority on load equalization of operation amount of respective processors shown in FIG. 9. In FIG. 10, since the loop control variable of B2 is not divided, the number of loop execution times of respective processors is the same as that before parallelization. Instead, the operation in the loop is divided into four operations and allotted to respective processors. In FIG. 9 and FIG. 10, variables a, b, c and d are obtained in the loop. In FIG. 9, variables are obtained in the range allocated to each processor, but in FIG. 10, the variable a is calculated by 1001, the variable b is calculated by 1002, the variable c is calculated by 1003, and the variable d is calculated by 1004, respectively. In this case, if the first operation of 1001 and 1003 is executed, the calculation of 1004 can be executed, and the operation can be finished before reading all the 100 elements of each variable into the cache memory. Therefore, the cache memory to be used is, for example, 120 bytes which is equivalent to the data amount of 15 elements ($x[1-2]$, $y[1-2]$, $a[1]$, $u[1-2]$, $v[1-2]$, $p[1-2]$, $q[1-2]$, $c[1] \times 2$). Accordingly, it is smaller than 25.6 K bytes in the case of the parallelization with priority on load equalization of operation amount shown in FIG. 9.

The method in which the calculation of reuse data is executed while reducing the capacity of the cache memory to be used as shown in FIG. 10 is the parallelization method to make the access time to the main memory shortest (main memory access reduction parallelization method). However, from the number of lines of each B2, the process amount of 1001 and 1003 is smaller, but the process amount of 1002 and 1004 is large, and load equalization is not achieved in the process amounts of 1001 to 1004. Therefore, in the case where the processor processing performance is high and data transfer performance from the main memory is low and in the case where the processor processing performance is high and the capacity of the cache memory is small, since data transfer amount from the main memory can be reduced even though equalization of operation amount cannot be attained, the parallelization method to make the access time to the main memory shortest is effective.

As described above, in the case where "calculation" is designated in the compile option 503 in FIG. 5 and the instruction lines 603 and 606 of the source code in FIG. 6, the code generation using the optimization by the operation load equalization parallelization method as shown in FIG. 9 is performed, and in the case where "data" is designated, the code generation using the optimization by the main memory access reduction parallelization method as shown in FIG. 10 is performed.

Figure 11:
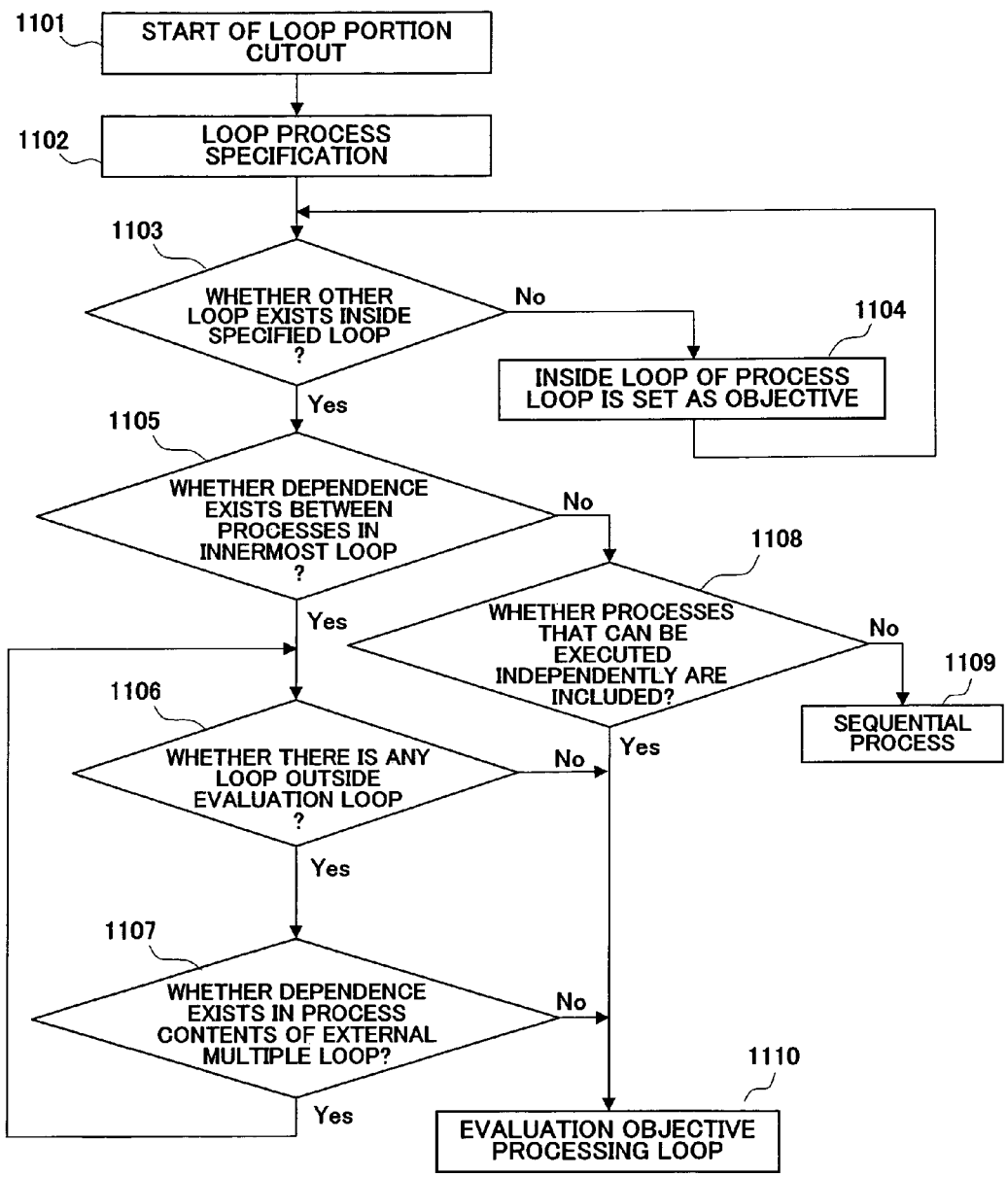
FIG. 11 is a flow chart showing an example of detailed process contents of a loop operation cutout unit in FIG. 4.

FIG. 11 shows detailed division procedure of processing loop executed by the loop operation cutout unit 405 in FIG. 4. FIG. 28 is a supplementary figure of FIG. 11. First, the outline of the processes in the division procedures of FIG. 11 will be described with reference to FIG. 28. In FIG. 28, a source code including multiple loops is shown as an example. In the multiple loops, if the process 11 of the innermost loop 2801 is investigated and it is confirmed that there is no dependence in the operation, the loop 2801 can be parallelized by plural CPUs and operated independently. The case where there is no dependence in the operation means, for example, the case where the result of a command sentence is not used by other command sentences in plural command sentences included in the process 11. Thereafter, the process of the loop 2811 positioned outside the loop 2801 is investigated. Herein, if it is confirmed that there is no dependence in the operation in the process 21, process 31 and process 41, the loop 2811 can be parallelized by plural CPUs and operated independently.

Subsequently, the process of the loop 2812 positioned further outside the loop 2811 is investigated. In the loop 2812, the process 12 is the operation dependent upon the process 11. If the process having dependence is included in this manner, it becomes difficult to simply apply the main memory access reduction parallelization method or the operation load equalization parallelization method to the loop 2812. Accordingly, in this case, the largest unit that can be divided by plural CPUs is the loop 2811. When the loop 2811 is divided, in the case where process is divided for 4 CPUs and executed by using the operation load equalization parallelization method, for example, the loop length of 300 of the loop 2811 is divided into the lengths of 75 (=300/4) and executed. On the other hand, in the case where the main memory access reduction parallelization method is used, for example, the loop 2801, loop 2802, loop 2803, and loop 2804 included in the loop 2811 is divided for 4 CPUs, respectively.

Note that, instead of the loop 2811 which is the largest loop that can be divided, for example, the innermost loop 2801 can be divided for plural CPUs by using the operation load equalization parallelization method and the like. However, in the process flow in this case, after the loop 2801 is executed by using, for example, four CPUs, the loop 2802 is executed by using the four CPUs, and synchronization among CPUs is required at the joint of the loop 2801 and the loop 2802 in some cases. Since such synchronization may decrease the operation efficiency, as mentioned above, it is desirable to search the largest loop in the range without dependence of operations as much as possible and examine the application of various division methods to this largest loop.

As described above, for example, in order to search the largest unit that can be divided by plural CPUs like the loop 2811 in FIG. 28, the loop cutout unit 405 in FIG. 4 performs the division procedure in FIG. 11. In FIG. 11, first, after the process executed by the loop cutout unit 405 is initiated (1101), the portion of performing the loop process is specified from the intermediate codes (1102). At this time, other loop process may be included inside the specified loop. Then, it is determined whether other loop exists inside the specified loop (1103). When there is a loop process inside the specified loop, after the inside loop is set as an objective (1104), it is determined whether other loop process is included in the objective loop again (1103). In this manner, the innermost loop is specified It is determined whether the dependence of operation exists between processes included in the innermost loop (1105), and when there is no dependence, the loop just outside the innermost loop is set as an evaluation objective. Therefore, it is determined whether any loop exists outside (1106). When there is no loop outside, this innermost loop becomes the evaluation objective processing loop (1110). When there is a loop outside, the loop is set as the evaluation objective, and it is determined whether any process having dependence relation of data among outside processes is included (1107). If it is the process without dependence relation among data, the loop further outside is set as an evaluation objective (1106). In this manner, by expanding the range of the evaluation objective loop, reusability of data on the register and reusability of data on the cache memory are increased, and access time to the main memory is readily shortened. More specifically, the application of the main memory access reduction parallelization method becomes easy.

Further, when there is dependence in the determination (1105) of the dependence of process of the innermost loop, it is determined whether there is the process that has no dependence relation among data used in the process in the innermost loop and can be executed independently (1108). When there is no process that can be executed independently, as a sequential process (1109), the parallelization evaluation of the present embodiment is not applied. When there is the process that can be executed independently in the determination of the presence or absence of the process that can be executed independently (1108), it becomes an objective of the parallelization evaluation of the present embodiment, and it is set as an evaluation objective processing loop (1110).

Figure 12:
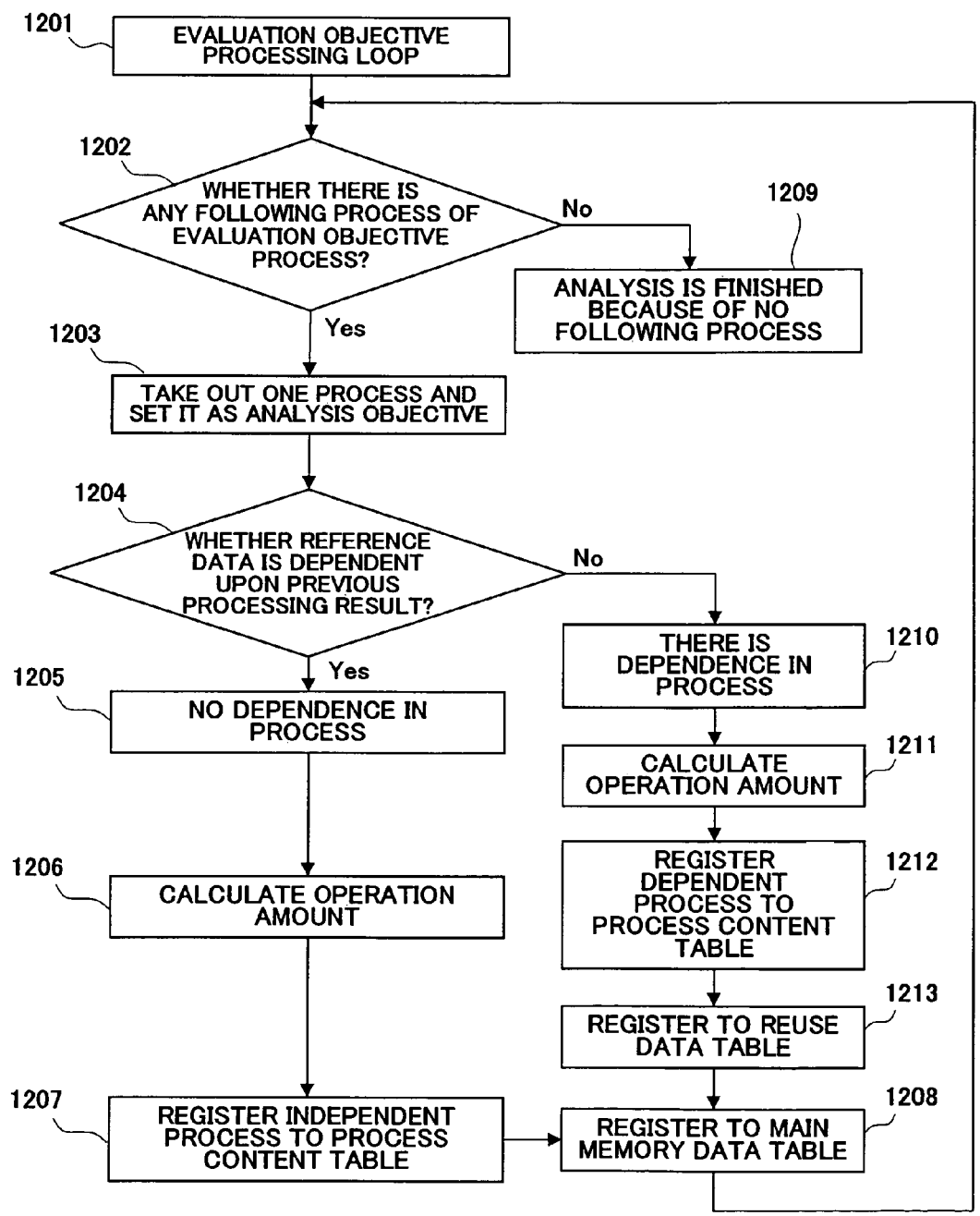
FIG. 12 is a flow chart showing an example of detailed process contents in a dependent process and independent process analysis unit, a data reusability analysis unit and a main memory data reference analysis unit in FIG. 4.

FIG. 12 shows detailed evaluation procedures of the dependent process and independent process analysis unit 406, the data reusability analysis unit 407, and the main memory data reference analysis unit 408 of FIG. 4. Note that the evaluation of the data reusability analysis unit 407 and the main memory data reference analysis unit 408 is carried out also in FIG. 16. In FIG. 12, the evaluation is made on the basis of the evaluation objective loop (1201) obtained as a result of FIG. 11. After it is determined whether there is the process in the evaluation objective processing loop (1202), the process is taken out one after another and the evaluation is executed (1203).

It is determined whether data referenced in one process is dependent upon the previous processing result (1204), and in the case where it is not dependent (1205), after the operation amount is calculated (1206), the fact that it is an independent process is registered to the process content table (1207). Then, since the used data has no dependence relation with other process and data is read from the main memory, the used data is registered to the main memory data table (1208). Further, the processing result is stored in the main memory, and this data is also recorded in the main memory data table (1208).

On the other hand, in the case where the data used in the process is determined to be dependent upon the previous processing result (1210) in the determination (1204), after the operation amount is calculated (1211), the dependent process is registered to the process content table (1212). Next, the data to reference the previous processing result is registered to the reuse data table (1213). The reuse data to be registered herein corresponds to a(i) and c(i) in the example of the source code 701 in FIG. 7. Further, reference data or writing data that is not dependent upon the previous process is registered to the main memory data table (1208). Furthermore, in the case where the reference data registered to the reuse data table is found in the item of store of the main memory data table, the store record of the main memory data table is deleted.

Through this procedure, the dependent process and independent process analysis concerning one process is completed. Thereafter, it is determined whether there is the process following the evaluation objective process (1202), and in the case where there is the following process, the analysis of the next one process is started (1203). At the stage when there is no following process in 1202, the process analysis is finished (1209).

FIG. 13 shows an example of the process content table used for the analysis of the dependent process and the independent process in FIG. 12. A process number 1301 is added as an identification number to each analyzed process. As a process item 1302, an operation type, communication function name between processors, and file input/output are described. By the contents of this process item, the absence or presence of data dependence is described as 1303. Further, a variable name used when performing the process is described as 1304, a dependent variable name is described as 1305, an operation amount [Flop] when performing the process is described as 1306, and the priority on the operation load equalization parallelization method or the priority on the main memory access reduction parallelization method as the parallelization method is described as 1307. The contents of the items 1301 to 1307 in the table are obtained in 1205, 1206, 1207, 1210, 1211 and 1212 in FIG. 12.

FIG. 14 shows an example of the reuse data table used for the analysis of the dependent process and the independent process in FIG. 12. In this table, a process number 1401 is managed distinctly for each process number 1301 allotted in the process content table in FIG. 13. Since it is necessary to distinguish plural read data and write data in the same process number 1401, they are distinguished by an auxiliary number 1402. Other than these, in the reuse data table, a reuse variable name 1403, a variable data length [Byte] 1404, the number of elements 1405, a stride width [Byte] 1406 showing interval of elements, and a reuse interval [Byte] 1407 showing data interval from first use to reuse are described.

FIG. 15 shows an example of the main memory data table used for the analysis of the dependent process and the independent process in FIG. 12. In this table, a process number 1501 is managed distinctly for each process number 1301 allotted in the process content table in FIG. 13. Since it is necessary to distinguish plural read data and write data in the same process number 1501, they are distinguished by an auxiliary number 1502. Other than these, in the main memory data table, a main memory reference variable name 1503, a variable data length [Byte] 1504, the number of variable elements 1505, a stride width [Byte] 1506 showing interval of elements and distinction of read data and write data 1507 are described.

Figure 16:
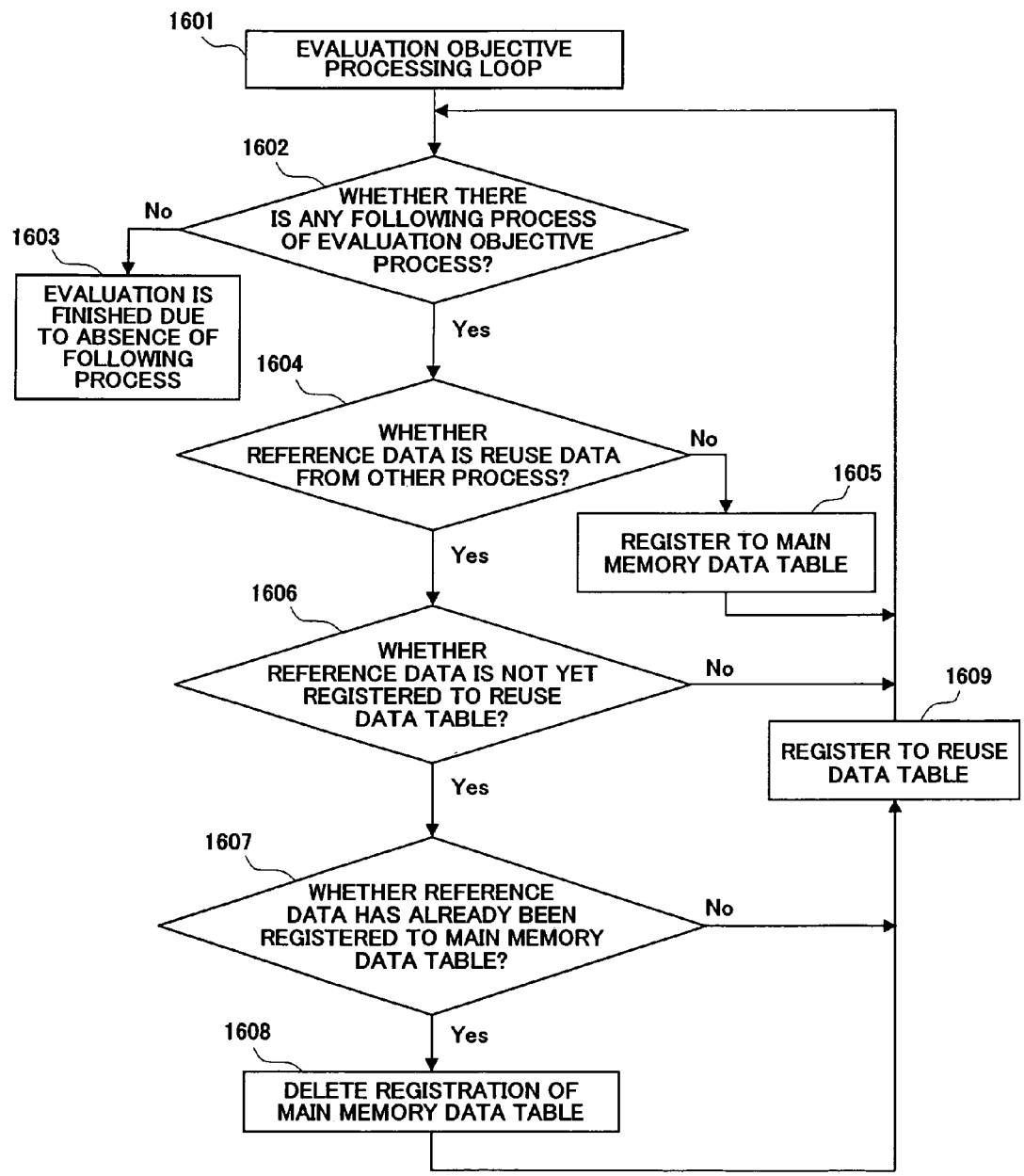
FIG. 16 is a flow chart showing an example of detailed process contents carried out in addition to FIG. 12 in the data reusability analysis unit in FIG. 4.

In FIG. 12, when there is dependence between processes, reusability of data between processes is analyzed. However, also in the case where there is no dependence relation between processes and data to be referenced are the same, it is the reuse data (that is, in the example of the source code 701 in FIG. 7, it corresponds to x(i) used in the operation of d(i)). Therefore, the investigation of reuse data is carried out through the procedure in FIG. 16. In FIG. 16, first, a processing loop to be an evaluation objective is inputted (1601). Then, it is determined whether there is the process following the evaluation objective process (1602), and if there is no process, the analysis process of reuse data is finished (1603). If there is the following process in the determination of 1602, one following process is taken out and is set as an evaluation objective. Further, it is determined whether the reference data of the evaluation objective is the data used in the previous processes (1604).

In the case where the reference data is not used in the previous process, if it is not registered to the main memory data table, it is registered thereto (1605), and procedure goes to the evaluation of the following processes (1602). In the case where the reference data has been used in the previous process, it is determined whether the reference data to be reused has already been registered to the reuse data table (1606). If it has already been registered, the procedure goes back to the evaluation of the following processes (1602). If it is not registered, it is confirmed whether the reference data is recorded in the main memory data table (1607). If it is not recorded in the main memory data table, it is registered to the reuse data table (1609), and the procedure goes back to the evaluation of the following processes (1602). If it is registered to the main memory data table in the confirmation (1607), after the registration of the main memory data table is deleted (1608), it is registered to the reuse data table (1609), and the procedure goes back to the evaluation of the following processes (1602). This operation is executed to the process of the evaluation objective, and the reuse data table in FIG. 14 and the main memory data table in FIG. 15 are created.

Figure 17:
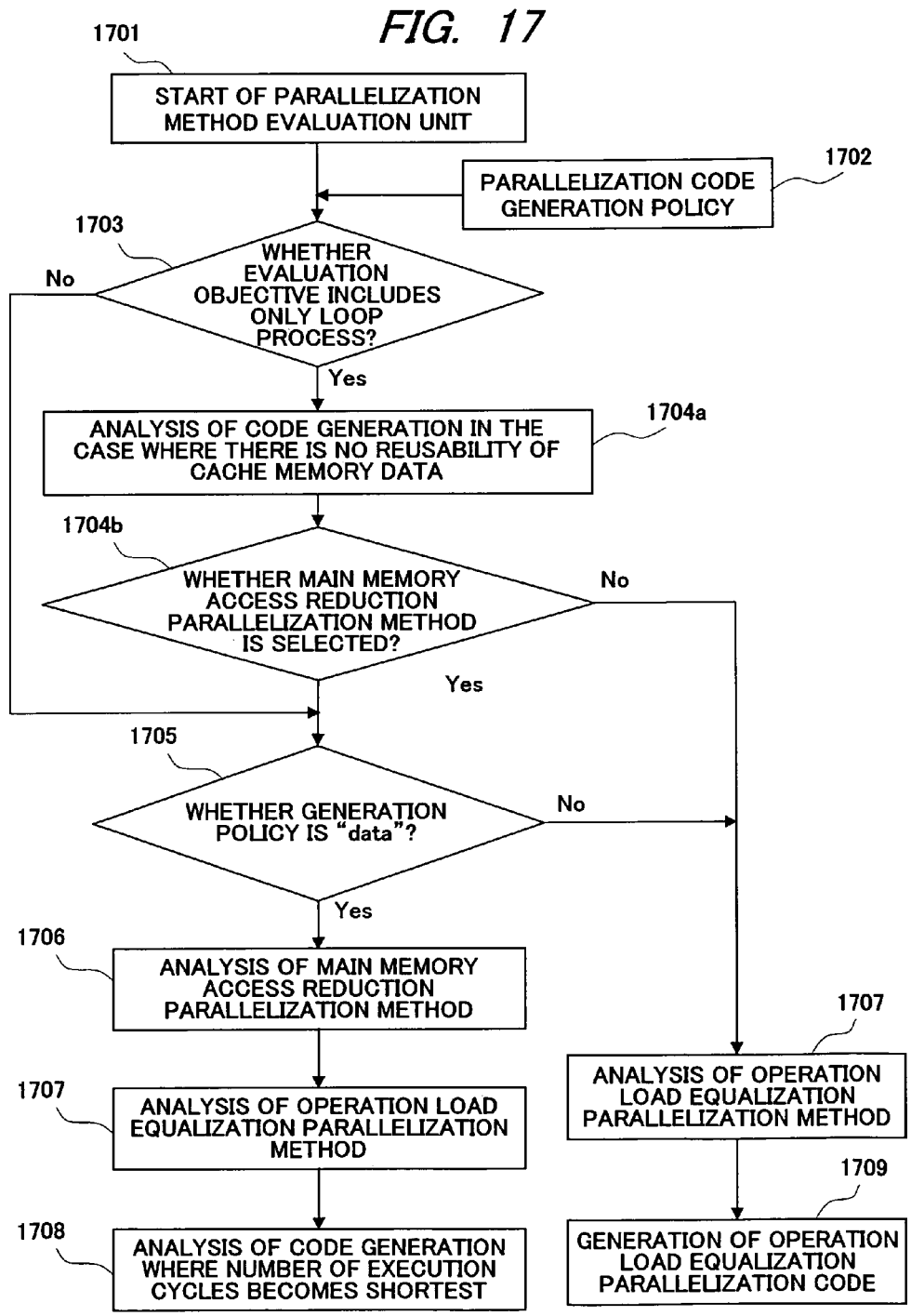
FIG. 17 is a flow chart showing an example of detailed process contents of a parallelization method evaluation unit in FIG. 4.
Figure 18:
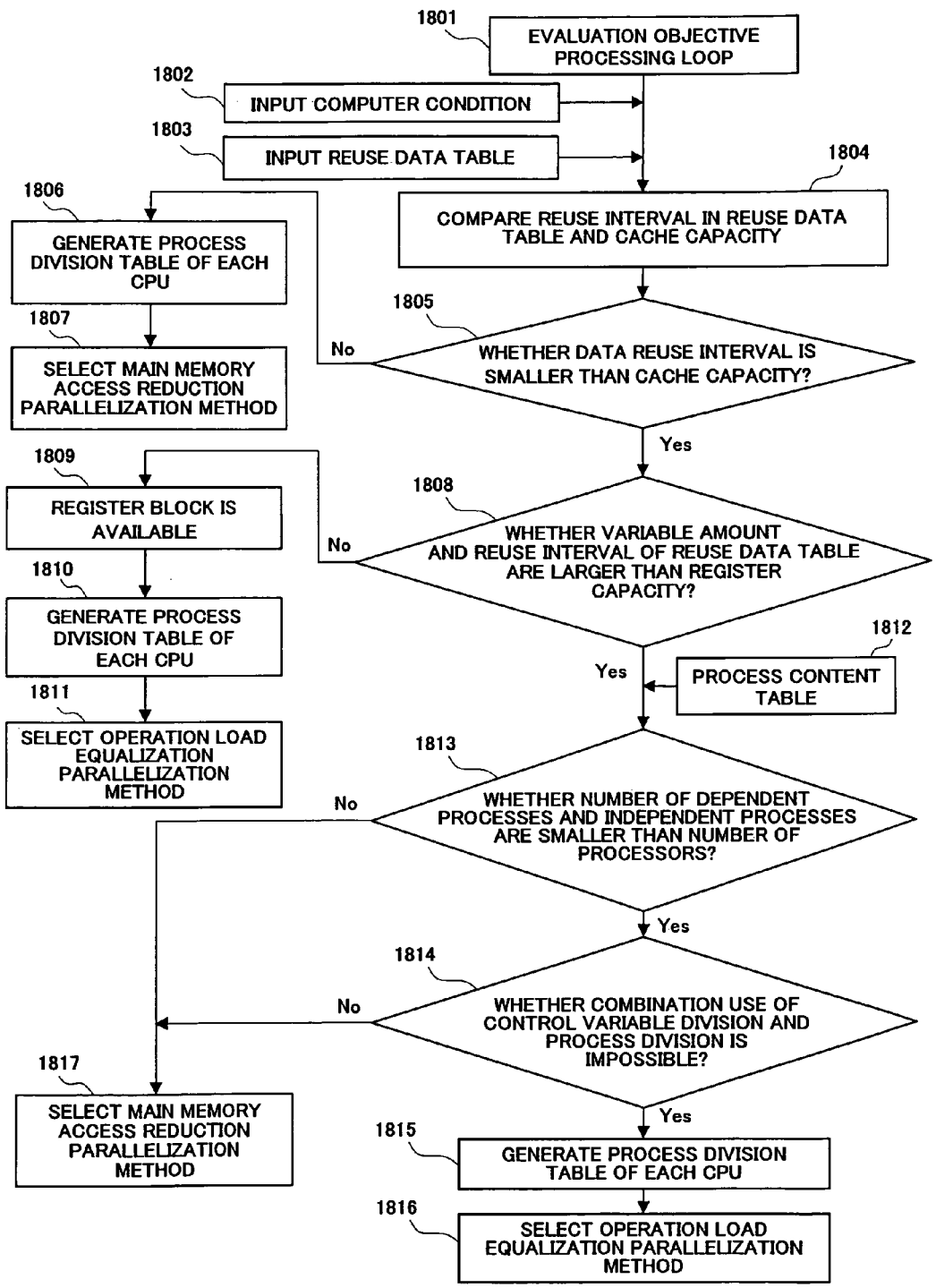
FIG. 18 is a flow chart showing an example of a code generation procedure in the case where there is no data reusability on a cache memory in the flow chart in FIG. 17.

In FIG. 4, when the process content table 414, the reuse data table 415, and the main memory data table 416 are created through the procedures mentioned above, the process by the parallelization method evaluation unit 409 is executed. FIG. 17 shows detailed evaluation procedures of the parallelization method evaluation unit, which is initiated at block 1701. As shown in FIG. 17, the parallelization method evaluation unit 409 first receives parallelization code generation policy (1702) inputted by a user, and then, it is determined whether the evaluation objective includes only the loop process (1703). When it includes only the loop process, the code generation analysis (1704a) in the case where there is no reusability of cache memory data as described later in FIG. 18 is performed, and it is selected whether the analysis of the main memory access reduction parallelization method or the analysis of the operation load equalization parallelization method is performed (1704b) according to the result. On the other hand, if it includes the process other than the loop process, since it is necessary to consider not only the reuse of data on the cache memory but also the division of process, the procedure shifts to the process of 1705 without performing the processes 1704a and b.

Next, when the process other than the loop process is included in the evaluation objective in 1703 or when there is reusability of the cache memory data in 1704b, it is determined whether the generation policy of the parallelization code inputted in 1702 is "data" (1705). If it is "data", the analysis of the main memory access reduction parallelization method (1706) is performed. Thereafter, the analysis of the operation load equalization parallelization method (1707) and the analysis of the code generation where the number of execution cycles becomes shortest (1708) are performed. On the other hand, if it is not "data" in the determination of the parallelization policy in 1705 or it is determined that there is no reusability of the cache memory data in 1704b, the analysis of the operation load equalization parallelization method is carried out (1707), and the procedure shifts to the generation of the operation load equalization parallelization code (1709). Note that the processes of 1708 and 1709 correspond to the process of the optimization code generation unit 410 in FIG. 4.

Hereinafter, the code generation analysis (1704a) in the case where there is no data reusability will be described with reference to FIG. 18, the analysis of the main memory access reduction parallelization method (1706) will be described with reference to FIG. 20, the analysis of the operation load equalization parallelization method (1707) will be described with reference to FIG. 21, and the analysis of code generation where the number of execution cycles becomes shortest (1708) will be described with reference to FIG. 22.

FIG. 18 shows the procedures of code analysis on the basis of evaluation objective processing loop in the case where there is no data reusability. After the evaluation objective processing loop is inputted (1801), computer conditions are inputted (1802), and the reuse data table is inputted (1803). An example of input contents 1901 used in this computer condition input (1802) is shown in FIG. 19. The items in the table include the number of registers, the number of processors, independent cache capacity, shared cache capacity, load cost from cache memory, load cost from main memory, store cost from main memory, synchronization acquisition cost, and the like.

Next, in FIG. 18, the variable reuse interval (1407 in FIG. 14) described in the reuse data table and the cache memory capacity are compared (1804). As a result of the comparison (1805) of the reuse intervals of all the reuse data and the cache memory capacity, if the reuse interval is larger than the cache memory capacity, since there is no reusability of data on the cache memory, it is necessary to examine the process division (section division) to increase the reusability of the cache data as mentioned in FIG. 10. Therefore, the process division table of each CPU is generated (1806), and the main memory access reduction parallelization method is selected (1807). In the process division table of each CPU, the range of loop control variable and the process contents executed by each processor are recorded, and it becomes the base of the parallel code generation. With regard to the actual process of code generation, the conventionally-known technology is used. As the conventional technology, technologies described in, for example, Non-Patent Document 1 and Patent Document 2 are known.

In the comparison (1805) of reuse intervals of all the reuse data and the cache memory capacity, if the cache memory capacity is larger, the variable amount and the reuse interval of the reuse data table are compared with the number of registers (1808). If the variable amount is smaller than the number of registers, the reuse data can be blocked so as to be allotted to registers (1809). At this time, instead of the reuse of data on the cache memory, the reuse of data on the register is performed, and the reusability of data of cache memory does not change even if the main memory access reduction parallelization method is applied. Therefore, the process division table of each CPU is created (1810), and the operation load equalization parallelization method is selected (1811).

On the other hand, if the variable amount and the reuse interval of the reuse data table are larger than the register capacity, in order to evaluate the application of the main memory access reduction parallelization method, the process content table shown in FIG. 13 is inputted (1812), and the process contents are evaluated. When the number of processes is larger in the comparison of the number of processes and the number of processors used at block 1813, since the effects by the application of the main memory access reduction parallelization method in which processes are sorted to each of plural processors appropriately can be expected, the main memory access reduction parallelization method is selected (1817). Further, even when the number of dependent processes and independent processes is smaller than the number of processors, it is determined whether the control variable division and the process division are used in combination (1814), and when the combined use is possible, the main memory access reduction parallelization method is selected (1817). As a result of the determination whether the control variable division and the process division are used in combination (1814), when the combined use is impossible, the parallelization method to sort process contents to each of the processors as shown in FIG. 10 cannot be applied. Therefore, the process division table for each CPU is created (1815), and the operation load equalization parallelization method is selected (1816).

Figure 20:
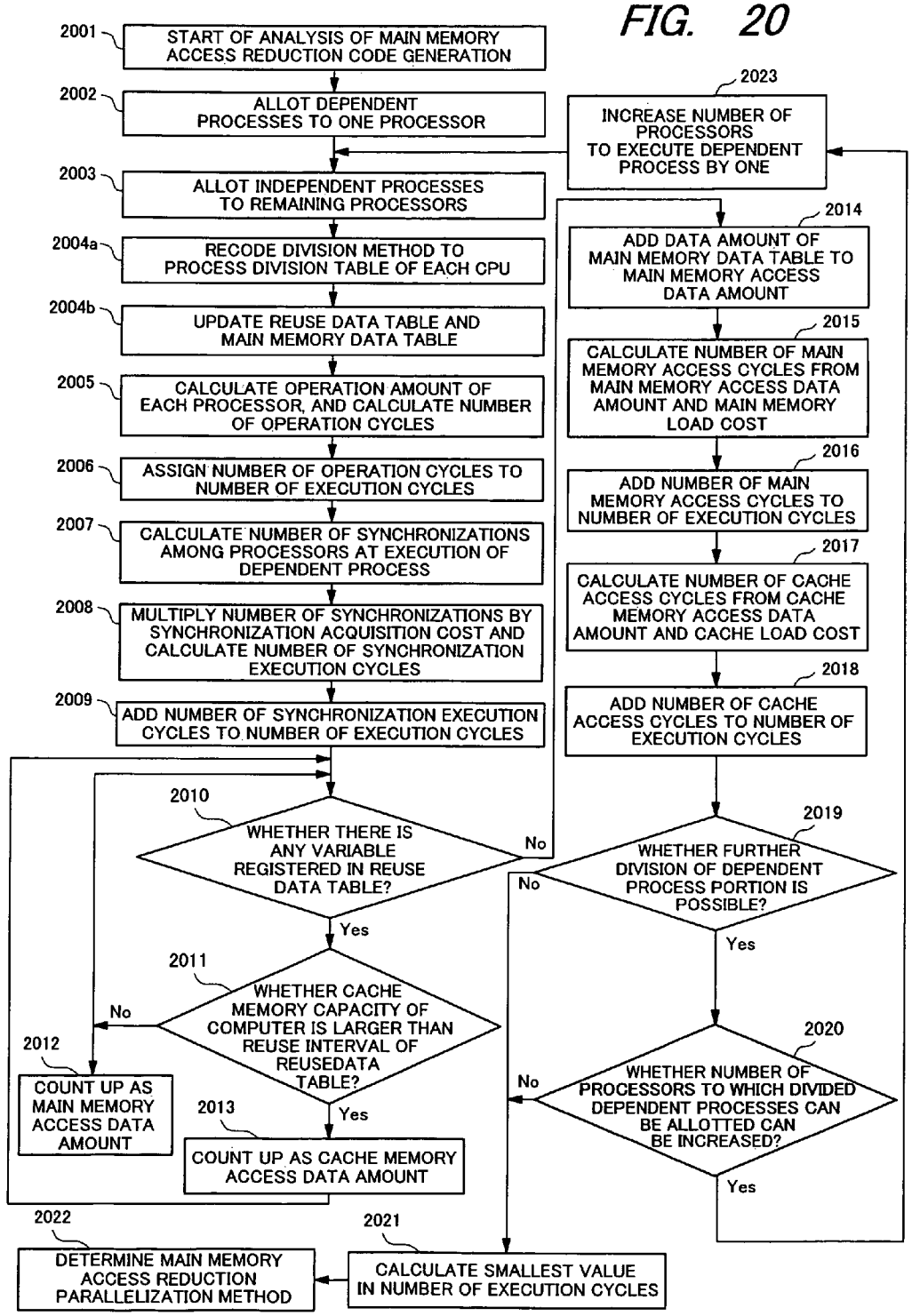
FIG. 20 is a flow chart showing an example of detailed process contents when performing the analysis of the main memory access reduction parallelization method in FIG. 17.

FIG. 20 shows detailed procedures of the analysis of the main memory access reduction parallelization method (1706) in FIG. 17. As a result of the analysis in FIG. 18, the analysis of the main memory access reduction code generation is started (2001). The contents of the analysis in FIG. 20 will be roughly described below. First, dependent processes are allotted to one processor and other processes are allotted to remaining processors, and then the processes and the load on the main memory access are made equal and the number of cycles necessary for the execution is obtained. Thereafter, while increasing the number of processors to which dependent process is allotted, the number of cycles necessary for the execution is obtained. This operation is repeated as many times as the smaller one of the number of dependent processes and the number of processors, and the minimum value of the number of processing cycles and the process division method to realize the same are obtained.

Hereinafter, prior to the description of details of the contents of the analysis in FIG. 20, a concrete image of the analysis contents of FIG. 20 will be first described with reference to FIG. 29, and then detailed description of FIG. 20 will be made. FIG. 29 is a supplementary figure of FIG. 20, which shows an example of the process division table of each CPU created in the process of FIG. 20. The process division table shows that plural processes corresponding to plural process numbers in the process content table shown in FIG. 13 are divided for each of the CPUs. In the example of FIG. 29, it is assumed that there is operation dependence in the process 11, process 12, process 13 and process 14. In the first stage, all the dependent processes 11 to 14 are executed in CPU 0, and the calculation result of the number of execution cycles thereof through the processes of FIG. 20 is 150.

Next, in order to reduce this number of execution cycles, the process 12 is allocated to CPU 1. Consequently, the process to synchronize CPU 0 and CPU 1 is added ("synchronization (0, 1)" in FIG. 29). The number of execution cycles calculated in this case is 130. In order to further reduce the number of execution cycles, the process 13 is allocated to CPU 2. Consequently, the process to synchronize CPU 0 and CPU 2 is added ("synchronization (0, 2)" in FIG. 29). The number of execution cycles calculated in this case is 120. In this manner, the process division method where the number of execution cycles becomes smallest (120 in this case) is determined, and the actual codes are generated on the basis of the method.

In FIG. 20, in concrete, dependent processes are first allotted to one processor (2002), independent processes are allotted to remaining processors (2003), and the division method is recorded to the process division table of each CPU (2004a). In this process division table, the process contents executed by each processor are described for each identification number. Then, the reuse data table and the main memory data table are updated (2004b). More specifically, by the division of processes, the reuse interval 1407 in the reuse data table may be changed, and accordingly, the main memory reference variable name 1503 in the main memory data table may be changed. Therefore, the revision thereof is performed. Thereafter, with reference to the process content table and the process division table, the number of required operation cycles is calculated from the operation amount of each processor (2005). With using the number of execution cycles for each process division method as a variable, the number of operation cycles calculated in 2005 is assigned (2006).

Next, the number of synchronizations among processors in the execution of dependent process is calculated (2007). When the dependent processes are executed by one processor, the synchronization among processors is zero, but when the dependent processes are allotted and executed by plural processors, in order to ensure the processing order, the synchronization among processors is required. The synchronization needs to be acquired in only the processors that perform the dependent process, and accordingly, the identification numbers of the processors that are to be synchronized are obtained and recorded in the process division table of each CPU. The number of synchronizations obtained in 2007 is multiplied by the synchronization acquisition cost described in the computer condition of FIG. 19, and the number of synchronization execution cycles is calculated (2008). The number of synchronization execution cycles obtained here is added to the number of execution cycles (2009).

Subsequently, the number of access cycles of data used in the process is obtained. It is determined whether there is the process using a variable registered to the reuse data table (2010). In the case where there is the process, it is determined whether the cache memory capacity of the computer is larger than the reuse interval of one variable of the reuse data table (2011), and the data amount is counted. When the cache memory capacity is smaller than the reuse interval, the data overflows from the cache memory in this variable, and since data is read from the main memory at the reuse, it counts up as the main memory access data amount (2012). Thereafter, it is determined whether there is next variable registered to the reuse data table (2010).

Further, in the case where it is determined that the reuse interval of the reuse data table is smaller than the cache memory capacity in 2011, since it is on the cache memory when reusing the variable, after it counts up (2013) as cache memory access data amount, the procedure shifts to the process of 2010, and the evaluation of the next variable registered to the reuse data table is carried out. When there is no variable to be processed next in 2010, the number of main memory access cycles and the number of cache memory access cycles are calculated.

In concrete, first, the data amount of the main memory data table is added to the main memory access data amount (2014), and the number of main memory access cycles is calculated from the main memory access data amount and the main memory load cost (2015), and the number of main memory access cycles is added to the number of execution cycles (2016). Further, with regard to the store data to the main memory, since the data amount is obtained from FIG. 15, the number of main memory access cycles can be obtained by using the main memory store cost in FIG. 19. Therefore, this number of cycles is added to the number of execution cycles. Next, the number of cache access cycles is calculated from the cache memory access data amount and the cache load cost (2017), and the number of cache access cycles is added to the number of execution cycles (2018). By this means, the number of execution cycles to one division method is obtained.

Thereafter, the procedure shifts to the calculation of the number of execution cycles in the case where the process of dependent process portion is further divided. First, it is determined whether further division of the dependent process portion is possible (2019). If the division is not possible, the smallest value in the numbers of execution cycles calculated heretofore is calculated (2021), and the main memory access reduction parallelization method is determined (2022). In the case where dependent process can be further divided in 2019, it is determined whether there exists a processor to which divided dependent process is newly allotted (2020). If there is no processor to which divided dependent process is newly allotted, the procedure shifts to the process of 2021, and the smallest value in the numbers of execution cycles is calculated, and the main memory access reduction parallelization method is determined (2022). If there exists a processor to which divided dependent process is newly allotted in 2020, the number of processors to execute dependent process is increased by one (2023), and the procedure shifts to the process of 2003. By executing the process of FIG. 20, the main memory access reduction parallelization method in which the number of execution cycles is shortest is obtained.

Figure 21:
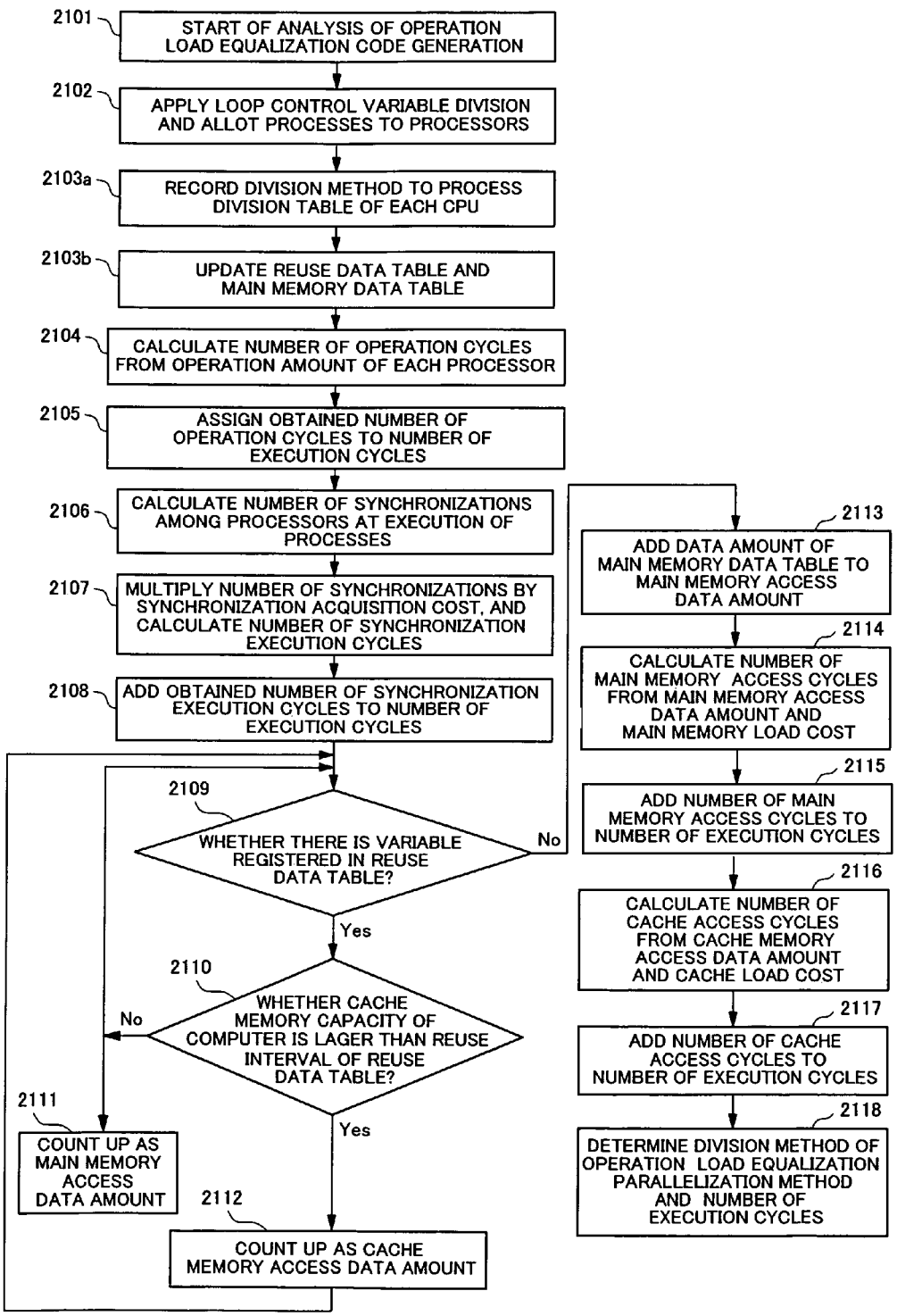
FIG. 21 is a flow chart showing an example of detailed process contents when performing the analysis of the operation load equalization parallelization method in FIG. 17.

FIG. 21 shows the procedures of the analysis of the operation load equalization parallelization method (1707) in FIG. 17. In FIG. 21, the analysis of operation load equalization code generation is started (2101), and the processes are first allotted to processors by applying the loop control variable division (2102). This division method is recorded in the process division table of each CPU (2103a). In the process division table, process contents are described for each identification number of each processor. Then, the reuse data table and the main memory data table are updated (2103b). However, this process in 2103b is unnecessary in some cases because the reuse interval 1407 in the reuse data table does not change normally even if the loop control variable is divided.

Next, the number of operation cycles and the number of synchronization cycles among processors are obtained respectively and the total value thereof is calculated as the number of execution cycles. In concrete, the operation amount of each processor is first obtained with reference to the process content table and the process division table, and the number of cycles required for the operation is obtained from the operation performance and the like described in FIG. 19 (2104). The obtained number of operation cycles is assigned to the number of execution cycles (2105). The number of synchronizations among processors at the process execution is calculated (2106). The number of synchronizations is multiplied by the synchronization acquisition cost registered in FIG. 19, thereby calculating the number of synchronization execution cycles (2107). The obtained number of synchronization execution cycles is added to the number of execution cycles (2108).

Subsequently, the access time of data to be used in the process is obtained. With regard to the data to be used, the data is classified into that inputted/outputted from the cache memory and that inputted/outputted from the main memory, and the access times thereof are respectively obtained. First, it is determined whether there is the data registered to the reuse data table (2109). In the case where there is the registered data, variables are evaluated one after another in accordance with the registration order. With regard to the variables to be evaluated, the cache memory capacity and the variable reuse interval are compared (2110). In the case where the cache memory capacity is smaller than the reuse interval, this variable becomes the data to be inputted/outputted from the main memory, and it counts up as the main memory access data amount (2111). Thereafter, it is determined whether there is next variable registered to the reuse data table (2109). In the case where the cache memory capacity is larger than the reuse interval in 2110, since reuse data is inputted/outputted from the cache memory, it counts up as the cache memory access data amount (2112). Thereafter, it is determined whether there is next variable registered to the reuse data table (2109). By repeating this loop process, all the variables registered to the reuse data table are analyzed one after another.

At the time when all the analyses are completed, the number of cycles of the main memory access and the number of cycles of the cache memory access are obtained. In concrete, when there is no registered variable to be analyzed next in 2109, the data amount of the main memory data table is added to the main memory access data amount (2113). Next, the number of main memory access cycles is calculated from the main memory access data amount and the main memory load cost (2114), and the number of main memory access cycles is added to the number of execution cycles (2115). Further, with regard to store data to the main memory, since the data amount has already been obtained from FIG. 15 and the number of main memory access cycles can be obtained by using the main memory store cost in FIG. 19, this number of cycles is added to the number of execution cycles.

With regard to the cache memory access, the number of cache access cycles is calculated from the cache memory access data amount and the cache memory load cost (2116), and the number of cache access cycles is added to the number of execution cycles (2117). By these procedures, the process division table of each CPU and the number of execution cycles are obtained, and the division method of the operation load equalization parallelization method and the execution cycles corresponding thereto are determined (2118).

Figure 22:
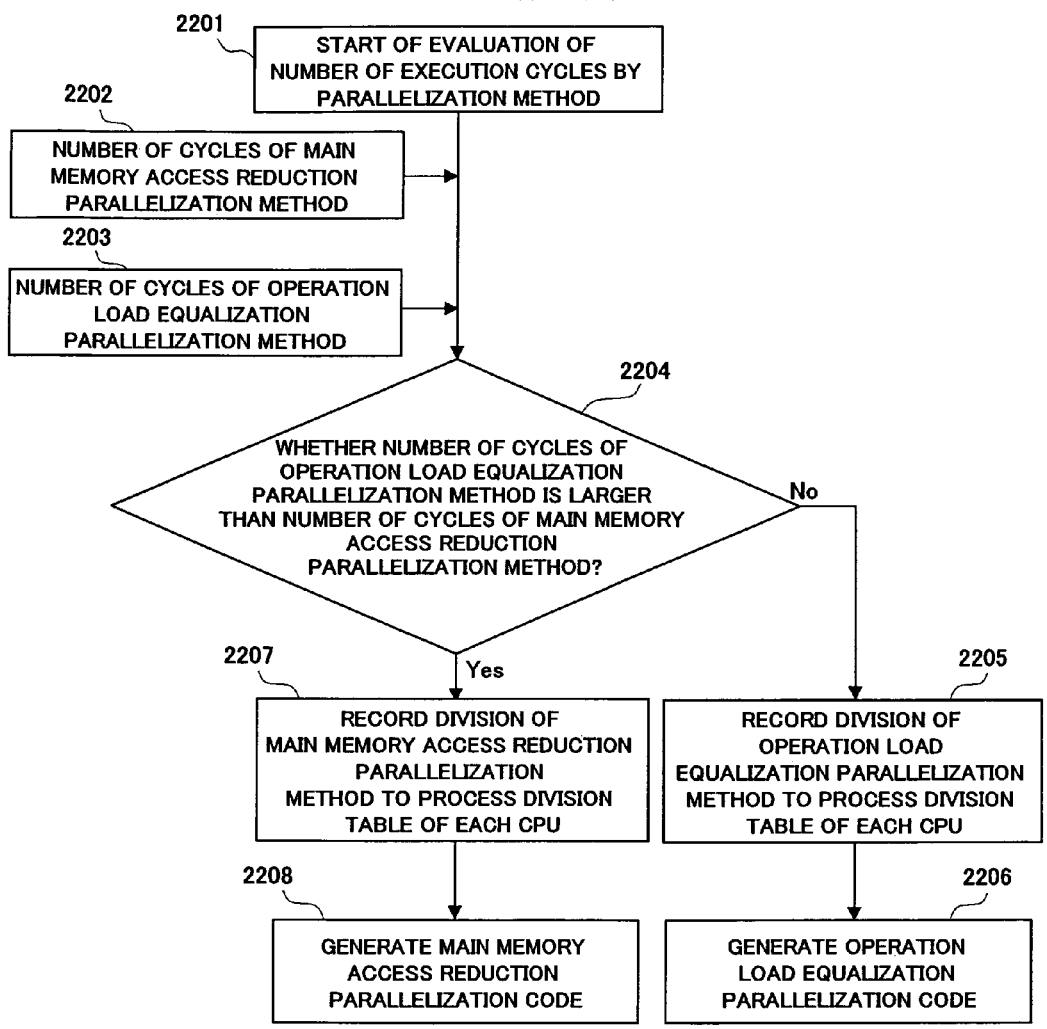
FIG. 22 is a flow chart showing an example of detailed process contents when performing the analysis of the code generation in which the number of execution cycles is shortest in FIG. 17.

FIG. 22 shows detailed procedures of the analysis of the code generation in which the number of execution cycles in FIG. 17 is shortest (1708). In the evaluation of the number of execution cycles by the parallelization method of FIG. 22 (2201), the number of cycles of the main memory access reduction parallelization method obtained in FIG. 20 (2202) and the number of cycles of the operation load equalization parallelization method obtained in FIG. 21 (2203) are inputted. The number of cycles of the operation load equalization parallelization method is compared with the number of cycles of the main memory access reduction parallelization method (2204), and in the case where the number of cycles of the operation load equalization parallelization method is smaller, the process division table of each CPU obtained in 2118 in FIG. 21 when the operation load equalization parallelization method is applied is recorded as the process division table of each CPU (2205), and the procedure shifts to the process of the operation load equalization parallelization code generation (2206). In the process division table of each CPU, an identification number is added for each processor to be executed, and the process executed by each processor is recorded. Therefore, when different processes are carried out by respective processors, a condition branch corresponding to the identification number is embedded in the stage of code generation, thereby controlling the processes.

On the other hand, in 2204, in the case where the number of execution cycles of the main memory access reduction parallelization method is smaller, the division of the main memory access reduction parallelization method is recorded in the process division table of each CPU (2207), and then the procedure shifts to the generation process of the main memory access reduction parallelization code (2208). Also in this case, in the process division table of each CPU, the identification number is added to each processor to be executed, and the process executed by each processor and the synchronization process to be acquired by a specified processor are recorded. Therefore, when different processes are carried out by respective processors, a condition branch corresponding to the identification number is embedded in the stage of code generation, thereby controlling the processes.

As the actual code generation method in accordance with the policy of the operation load equalization parallelization method mentioned above or the actual code generation method in accordance with the policy of the main memory access reduction parallelization method, the methods of Patent Document 2, Non-Patent Document 1, and Non-Patent Document 3 are known.

As described above, by using the optimum code generation method according to the first embodiment, in view of the aspects of the main memory access reduction, the equalization of the operation load of the processors and the combinations thereof, the optimum parallel codes with which the actual execution cycle time becomes shortest can be generated. Furthermore, in particular, the execution efficiency of plural SIMD processors or plural vector processors can be improved.

Second Embodiment

Figure 23:
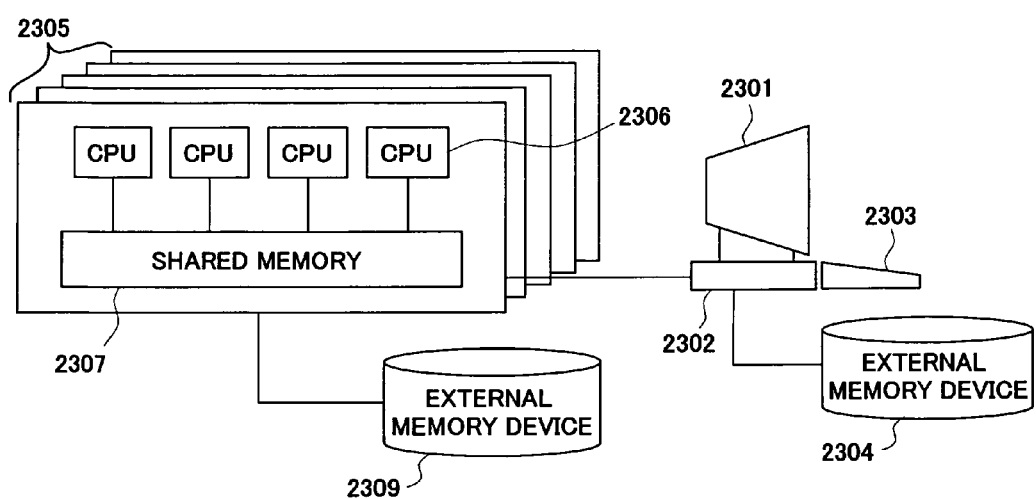
FIG. 23 is a configuration diagram showing an example of a computer system that executes control by using the codes generated in a code generation method according to a second embodiment of the present invention.

In a second embodiment, an example of the code generation method in the case where CPU does not comprise a shared cache in FIG. 1 in the first embodiment mentioned above will be described. FIG. 23 is a configuration diagram showing an example of a computer system that executes the control by using the codes generated in a code generation method according to the second embodiment of the present invention. The computer system in FIG. 23 includes a display unit 2301 and a terminal unit 2302 for executing the codes, a keyboard 2303 to input commands, an external memory device 2304 connected to the terminal, a calculation node group 2305 for executing the codes, and an external memory device 2309 connected to the calculation node group. The computer system in FIG. 23 has a configuration in which the shared cache is removed from the computer system in FIG. 1, and a shared memory 2307 is connected to each processor (CPU) 2306 in the calculation node group 2305.

Even in the case where no shared cache is disposed among plural processors as shown above, there are two types of parallelization methods similar to the first embodiment. For example, in the case where "calculation" is selected in 606 in FIG. 6, the operation load equalization parallelization method to divide the loop control variable is applied, and in the case where "data" is selected, the main memory access reduction parallelization method to divide also the communication functions and the reading of array data is applied. The difference from the first embodiment is that, since there is no cache memory, the calculation of the number of cache memory access cycles is unnecessary. The process concerning this calculation is performed by the parallelization method evaluation unit 409 in FIG. 4. The portions concerning the evaluation of the cache memory in the procedures of the parallelization method evaluation unit 409 shown in FIG. 17 are the analysis of the main memory access reduction parallelization method (1706) and the analysis of the operation load equalization parallelization method (1707).

FIG. 24 shows the analysis procedures of the main memory access reduction parallelization method in the case where the evaluation of the cache memory is not carried out. 2401 to 2409 in FIG. 24 are calculations of the number of cycles of divided operations and the number of cycles among processors, and are almost equal to 2001 to 2009 in FIG. 20 including the evaluation of the cache memory shown in the first embodiment. However, since there is no cache memory, the update process of the reuse data table and the main memory data table in 2004b in FIG. 20 is unnecessary, which is the point of difference.

Next, the number of cycles of the main memory access is calculated. In the case of a computer system not having a cache memory mounted thereon, since all the data necessary for the process are obtained by the access to the main memory, the total of the data amounts of the main memory data table and the reuse data table is set as the main memory access data amount (2410). The number of main memory access cycles is calculated from the main memory access data amount and the main memory load cost (2411). This number of main memory access cycles is added to the number of execution cycles (2412). Further, with regard to the store data to the main memory, since the data amount is already obtained from FIG. 15 and the number of main memory access cycles can be obtained by using the main memory store cost in FIG. 19, this number of cycles is added to the number of execution cycles. By this means, the entire number of execution cycles by one division method is obtained. Thereafter, the dependent process portion is divided for other processors to obtain the optimum division method. 2413 to 2417 that are the procedures at this time are the same as 2019 to 2023 in FIG. 20 in the case of having a cache memory.

FIG. 25 shows the analysis procedures of the operation load equalization parallelization method in the case of a computer system not having a cache memory mounted thereon.

2501 to 2508 in FIG. 25 are calculations of the number of cycles of divided operations and the number of cycles among processors, and are almost equal to 2101 to 2108 in FIG. 21 including the evaluation of the cache memory shown in the first embodiment. However, since there is no cache memory, the update process of the reuse data table and the main memory data table in 2103b in FIG. 21 is unnecessary, which is the point of difference.

Next, the number of cycles of the main memory access is calculated. In the case of a computer system not having a cache memory mounted thereon, since all the data necessary for the process are obtained by the access to the main memory, the total of the data amounts of the main memory data table and the reuse data table is set as the main memory access data amount (2509). The number of main memory access cycles is calculated from the main memory access data amount and the main memory load cost (2510). This number of main memory access cycles is added to the number of execution cycles (2511). Further, with regard to the store data to the main memory, since the data amount is already obtained from FIG. 15 and the number of main memory access cycles can be obtained by using the main memory store cost in FIG. 19, this number of cycles is added to the number of execution cycles. By this means, the division method of the operation load equalization parallelization method and the number of execution cycles are determined (2512). In the analysis of the code generation in which the number of execution cycles is shortest (1708) in FIG. 17 that is executed thereafter, the process is carried out in accordance with the procedures in FIG. 22 in the same manner as the first embodiment having a cache memory.

As described above, by using the optimum code generation method according to the second embodiment, it is possible to generate the optimum codes with which the actual execution cycle time becomes shortest even in the case where a CPU does not comprise a shared cache.

Third Embodiment

In a third embodiment, an example of the code generation method in the case where the loop control variable of the source code 701 in FIG. 7 in the first embodiment mentioned above is given by a variable instead of a constant will be described. FIG. 26 is a diagram showing an example of a source code to be an evaluation objective in the code generation method in the third embodiment of the present invention. In the source code 2601 shown in FIG. 26, the loop control variable i=1 to 400 that is a constant in the source code 701 in FIG. 7 is given by a variable i=m to n.

In such a case, in the analysis procedure of dependent process and independent process and the analysis procedure of data reusability in FIG. 12 and the analysis procedures of reusability of the used data in FIG. 16, the data amount is analyzed with using the variable directly. In the example of the reuse data table in FIG. 14 and the example of the main memory data table in FIG. 15, if the data amount, the stride width, and the reuse interval are not yet determined, they are expressed by an equation dependent on the loop control variable. In the evaluation of the parallelization method in FIG. 17, in the case where the parallelization method in which the number of execution cycles becomes shortest changes by the value of the loop control variable, a condition branch by the value of the loop control variable is added, and plural parallel codes are generated. For example, in the example in FIG. 26, it is supposed that the values of the loop control variables m and n are determined at the time of execution, and an example of the generation code in this case is shown in FIG. 27.

In the generation code shown in FIG. 27, in accordance with the values of the loop control variables m and n that are determined at the time when the code is executed on a computer, the parallelization method 1 (main memory access reduction parallelization method) 2701, the parallelization method 2 (main memory access reduction parallelization method) 2702, or the parallelization method 3 (operation load equalization parallelization method) 2703 is selected and executed. Therefore, at the code generation by a compiler or the like, unlike the conventional technology, one parallel code is not generated, but corresponding plural parallel codes are generated. Further, the computer system arranges such plural parallel codes on a memory and determines the value of the loop control variable dynamically calculated at the time of execution, and appropriately selects the parallel codes to be executed thereafter.

As described above, by using the optimum code generation method according to the third embodiment, the optimum codes with which the execution cycle time becomes shortest can be generated even in the case where the value of the loop control variable changes dynamically.

In the foregoing, the invention made by the inventors of the present invention has been concretely described based on the embodiments. However, it is needless to say that the present invention is not limited to the foregoing embodiments and various modifications and alterations can be made within the scope of the present invention.

According to the present invention, for a computer configured of plural processors that share a cache memory or a main memory, from a parallelization method to equally divide the loads of processors and a parallelization method to reduce accesses to a main memory, codes of a parallelization method whose execution time is shortest and execution efficiency is high can be generated. The present invention can be applied to a compiler or a code generation suitable for parallel processes.

What is claimed is:

1. An optimum code generation method in which, for a computer configured of plural processors which share a main memory or a cache memory, for a purpose of increasing execution efficiency of the plural processors while reducing data transfer amount from the main memory to the plural processors, optimum parallel codes processed by the plural processors are generated from a source code, wherein the computer system performs:
   a first step of analyzing process contents of the source code, and analyzing an operation amount and an operation sequence dependence relation of the plural processors, reusability of data of the cache memory, and a load data amount and a store data amount between the main memory or the cache memory and the plural processors;
   a second step of retaining the number of plural processors, access time of the main memory or access time of the cache memory, the number of registers, a capacity of the cache memory, a synchronization acquisition method among the plural processors and time required for synchronization, inputted by a user as performances of the computer;
   a third step of calculating the reusability of data in the cache memory based on a comparison between a data access interval from a point of first use to a point of reuse and a capacity of the cache memory; and
   a fourth step of dividing the process contents of the source code for the plural processors, and while estimating execution cycle time in the case where the divided source codes are executed by the plural processors on the basis of the first step and the second step, generating parallel codes with which the execution cycle time becomes shortest based on the calculated reusability of data in the cache memory.

2. The optimum code generation method according to claim 1, wherein each of the plural processors is a SIMD processor or a vector processor.

3. The optimum code generation method according to claim 1, wherein, in the fourth step, a division of a first method to increase the reusability of data of the cache memory and reduce the number of accesses from the plural processors to the main memory is performed for plural processes included in the source code.

4. The optimum code generation method according to claim 3, wherein, in the fourth step, a division of a second method to equalize operation process amounts to the plural processors is further performed for plural processes included in the source code.

5. The optimum code generation method according to claim 4, wherein, in the fourth step, the division of the second method is performed to a first source code to which the division of the first method has been performed, thereby generating a second source code, and the execution cycle time of the first source code and that of the second source code are compared and parallel codes corresponding to the source code whose execution cycle time is shorter are generated.

6. The optimum code generation method according to claim 4, wherein the computer system further performs a fifth step of retaining a selection which of the division of the first method or the division of the second method designated by a user in advance is performed.

7. The optimum code generation method according to claim 6, wherein the fifth step is realized by describing a parallelization objective range and whether the division of the first method or the division of the second method should be applied to the parallelization objective range, in the source code by the user.

8. The optimum code generation method according to claim 6, wherein the fifth step is realized by designating a parallelization objective range including a file name and a line number and whether the division of the first method or the division of the second method should be applied to the parallelization objective range, on a compiler command line by the user.

9. The optimum code generation method according to claim 4, wherein, when it has been confirmed by the first step that a loop control variable of an operation loop included in the source code is unspecified until parallel codes are executed on the computer, in the fourth step, the execution cycle time in the case where the division of the first method is applied and the execution cycle time in the case where the division of the second method is applied are estimated while changing a size of the loop control variable, and a condition branch for switching the methods to be applied in accordance with the size of the loop control variable is embedded into parallel codes so that a method whose execution cycle time is shorter can be selected from the division of the first method and the division of the second method for each size of the loop control variable.

10. A non-transitory computer-usable storage medium having computer readable instructions stored thereon for execution by a processor of a computer system to implement a compiler device that, for a computer configured of plural processors which share a main memory or a cache memory, for a purpose of increasing execution efficiency of the plural processors while reducing data transfer amount from the main memory to the plural processors, generates optimum parallel codes processed by the plural processors from a source code, the compiler device implementing an optimum code generation system comprising:
- a first function of analyzing process contents of the source code, and analyzing an operation amount and an operation sequence dependence relation of the plural processors, reusability of data of the cache memory, and a load data amount and a store data amount between the main memory or the cache memory and the plural processors;
- a second function of retaining the number of plural processors, access time of the main memory or access time of the cache memory, the number of registers, a capacity of the cache memory, a synchronization acquisition method among the plural processors and time required for synchronization, inputted by a user as performances of the computer;
- a third function of calculating the reusability of data in the cache memory based on a comparison between a data access interval from a point of first use to a point of reuse and a capacity of the cache memory; and
- a fourth function of dividing the process contents of the source code for the plural processors, and while estimating execution cycle time in the case where the divided source codes are executed by the plural processors on the basis of the first function and the second function, generating parallel codes with which the execution cycle time becomes shortest based on the calculated reusability of data in the cache memory.

11. The computer-usable storage medium according to claim 10, wherein, by the fourth function, a division of a first method to increase the reusability of data of the cache memory and reduce the number of accesses from the plural processors to the main memory is performed for plural processes included in the source code.

12. The computer-usable storage medium according to claim 11, wherein, by the fourth function, a division of a second method to equalize operation process amounts to the plural processors is further performed for plural processes included in the source code.

13. The computer-usable storage medium according to claim 12, wherein, by the fourth function, the division of the second method is performed to a first source code to which the division of the first method has been performed, thereby generating a second source code, and the execution cycle time of the first source code and that of the second source code are compared and parallel codes corresponding to the source code whose execution cycle time is shorter are generated.

* * * * *